US010942905B2

(12) United States Patent
Nefedov et al.

(10) Patent No.: US 10,942,905 B2
(45) Date of Patent: Mar. 9, 2021

(54) SYSTEMS AND METHODS FOR CLEANSING AUTOMATED ROBOTIC TRAFFIC

(71) Applicant: Camelot UK Bidco Limited, London (GB)

(72) Inventors: Nikolai Nefedov, Gattikon (CH); Eftim Pop-Lazarov, Morgarten (CH); James Pringle, Philadelphia, PA (US)

(73) Assignee: Camelot UK Bidco Limited, London (GB)

( * ) Notice: Subject to any disclaimer, the term of this patent is extended or adjusted under 35 U.S.C. 154(b) by 400 days.

(21) Appl. No.: 15/190,709

(22) Filed: Jun. 23, 2016

(65) Prior Publication Data

US 2016/0299923 A1      Oct. 13, 2016

Related U.S. Application Data

(63) Continuation-in-part of application No. 14/605,134, filed on Jan. 26, 2015, now Pat. No. 10,489,361.

(Continued)

(51) Int. Cl.
| | |
|---|---|
| *G06F 16/215* | (2019.01) |
| *G06F 16/35* | (2019.01) |
| *G06F 16/23* | (2019.01) |
| *G06Q 10/10* | (2012.01) |
| *G06F 21/55* | (2013.01) |

(52) U.S. Cl.
CPC ........ *G06F 16/215* (2019.01); *G06F 16/2358* (2019.01); *G06F 16/353* (2019.01); *G06F 21/552* (2013.01); *G06Q 10/10* (2013.01)

(58) Field of Classification Search
None
See application file for complete search history.

(56) References Cited

U.S. PATENT DOCUMENTS 8,244,752 B2     8/2012  Buehrer et al.
2008/0004958 A1*  1/2008  Ralph ................. G06Q 30/02
                                                705/14.45

(Continued)

FOREIGN PATENT DOCUMENTS

EP          2525299 A1      11/2012

OTHER PUBLICATIONS

International Search Report and Written Opinion dated Sep. 25, 2015 from associated PCT International Patent Application PCT/IB2015/001045.

(Continued)

*Primary Examiner* — Kris E Mackes
*Assistant Examiner* — Soheila (Gina) Davanlou
(74) *Attorney, Agent, or Firm* — McCarter & English, LLP

(57) ABSTRACT

Exemplary embodiments of the present disclosure provide for cleansing data generated by one or more servers in response to database interactions resulting from an automated software robot interacting with the one or more servers via a telecommunications network. Log entries in usage logs corresponding to events during a session can be analyzed to determine relationships between events and the usage logs can be classified based on the relationships as either corresponding to human behavior or automated software robot behavior. Usage logs corresponding to automated software robot behavior can be removed from further analysis.

20 Claims, 17 Drawing Sheets

Related U.S. Application Data

(60) Provisional application No. 62/290,569, filed on Feb. 3, 2016, provisional application No. 61/931,973, filed on Jan. 27, 2014.

(56) References Cited

U.S. PATENT DOCUMENTS

| | | |
|---|---|---|
| 2008/0313115 A1 | 12/2008 | Galvin |
| 2009/0094311 A1 | 4/2009 | Awadallah et al. |
| 2009/0144263 A1 | 6/2009 | Brady |
| 2010/0082800 A1 | 4/2010 | Wei et al. |
| 2010/0115621 A1 | 5/2010 | Staniford et al. |
| 2010/0150393 A1* | 6/2010 | Ni .................. G06F 17/2785 382/100 |
| 2010/0262457 A1* | 10/2010 | House ............... G06Q 30/02 705/7.29 |
| 2011/0023115 A1 | 1/2011 | Wright |
| 2011/0131652 A1 | 6/2011 | Robinson et al. |
| 2012/0117649 A1 | 5/2012 | Holloway et al. |
| 2012/0144020 A1 | 6/2012 | Carey et al. |
| 2012/0191693 A1 | 7/2012 | Alexander |
| 2012/0323677 A1 | 12/2012 | Bottou et al. |
| 2013/0085993 A1* | 4/2013 | Li et al. ............. G06F 17/30575 707/636 |
| 2013/0198203 A1 | 8/2013 | Bates et al. |
| 2013/0297589 A1* | 11/2013 | Work ................. G06Q 10/1053 707/722 |
| 2014/0075558 A1 | 3/2014 | Ward et al. |
| 2014/0320392 A1* | 10/2014 | Chizeck ............... G06F 3/016 345/156 |
| 2015/0075558 A1 | 3/2015 | Hsia |
| 2015/0213065 A1 | 7/2015 | Skisk et al. |

OTHER PUBLICATIONS

International Search Report and Written Opinion from related international patent application No. PCT/US2017/038330 dated Sep. 11, 2017.
Non-Final Office Action from related U.S. Appl. No. 14/605,134 dated Oct. 3, 2017.
Non-Final Office Action from related U.S. Appl. No. 14/605,134 dated Mar. 22, 2017.
Omer et al. "Distinguishing Humans from Bots in web Search logs" copyright Oct. 25, 2010 ACM.
Final Office Action from related U.S. Appl. No. 14/605,134 dated May 17, 2018.

* cited by examiner

| date_time | query / event_type | docid |
|---|---|---|
| Thu Oct 03 02:08:21 CDT 2013 | event_alum_query | |
| Thu Oct 03 02:08:25 CDT 2013 | event_alum_summary | 451718876 |
| Thu Oct 03 02:08:25 CDT 2013 | event_alum_summary | 452543606 |
| Thu Oct 03 02:08:25 CDT 2013 | event_alum_summary | 453663027 |
| Thu Oct 03 02:08:25 CDT 2013 | event_alum_summary | 453948527 |
| Thu Oct 03 02:08:25 CDT 2013 | event_alum_summary | 455331314 |
| Thu Oct 03 02:08:25 CDT 2013 | event_alum_summary | 455548121 |
| Thu Oct 03 02:08:25 CDT 2013 | event_alum_summary | 455565294 |
| Thu Oct 03 02:08:25 CDT 2013 | event_alum_summary | 456178245 |
| Thu Oct 03 02:08:25 CDT 2013 | event_alum_summary | 456185643 |
| Thu Oct 03 02:08:25 CDT 2013 | event_alum_summary | 456789883 |
| Thu Oct 03 02:08:36 CDT 2013 | event_alum_query | |
| Thu Oct 03 02:08:39 CDT 2013 | event_alum_summary | 83842905 |
| Thu Oct 03 02:08:39 CDT 2013 | event_alum_summary | 91312605 |
| Thu Oct 03 02:08:39 CDT 2013 | event_alum_summary | 94262714 |
| Thu Oct 03 02:08:39 CDT 2013 | event_alum_summary | 274921830 |
| Thu Oct 03 02:08:39 CDT 2013 | event_alum_summary | 286667856 |
| Thu Oct 03 02:08:39 CDT 2013 | event_alum_summary | 423222888 |
| Thu Oct 03 02:08:39 CDT 2013 | event_alum_summary | 443012176 |
| Thu Oct 03 02:09:27 CDT 2013 | event_alum_query | |
| Thu Oct 03 02:09:30 CDT 2013 | event_alum_summary | 9201734 |
| Thu Oct 03 02:09:30 CDT 2013 | event_alum_summary | 89840799 |
| Thu Oct 03 02:09:30 CDT 2013 | event_alum_summary | 274014126 |
| Thu Oct 03 02:09:30 CDT 2013 | event_alum_summary | 292945638 |
| Thu Oct 03 02:09:30 CDT 2013 | event_alum_summary | 337634764 |
| Thu Oct 03 02:09:30 CDT 2013 | event_alum_summary | 413820274 |
| Thu Oct 03 02:09:30 CDT 2013 | event_alum_summary | 421800267 |
| Thu Oct 03 02:09:30 CDT 2013 | event_alum_summary | 426860724 |
| Thu Oct 03 02:09:30 CDT 2013 | event_alum_summary | 437775377 |
| Thu Oct 03 02:09:30 CDT 2013 | event_alum_summary | 440567479 |
| Thu Oct 03 02:12:17 CDT 2013 | event_alum_export | 89840799 |
| Thu Oct 03 02:12:17 CDT 2013 | event_alum_export | 337634764 |
| Thu Oct 03 02:12:17 CDT 2013 | event_alum_export | 413820274 |
| Thu Oct 03 02:12:17 CDT 2013 | event_alum_export | 426860724 |

Fig. 4A

| date_time | event_type | docid |
|---|---|---|
| 2013-10-03 21:22:32 | event_alum_query | |
| 2013-10-3 21:22:35 | event_alum_summary | 55922094 |
| 2013-10-3 21:22:35 | event_alum_summary | 28666135 |
| 2013-10-3 21:22:35 | event_alum_summary | 1435906 |
| 2013-10-3 21:22:35 | event_alum_summary | 1435818 |
| 2013-10-3 21:22:35 | event_alum_summary | 23499744 |
| 2013-10-3 21:22:35 | event_alum_summary | 16689918 |
| 2013-10-3 21:22:35 | event_alum_summary | 17126675 |
| 2013-10-3 21:22:35 | event_alum_summary | 17996137 |
| 2013-10-3 21:22:35 | event_alum_summary | 19530650 |
| 2013-10-3 21:22:35 | event_alum_summary | 26025510 |
| 2013-10-3 21:22:45 | event_alum_save | 55922094 |
| 2013-10-3 21:22:45 | event_alum_save | 28666135 |
| 2013-10-3 21:22:45 | event_alum_save | 1435906 |
| 2013-10-3 21:22:45 | event_alum_save | 1435818 |
| 2013-10-3 21:22:45 | event_alum_save | 23499744 |
| 2013-10-3 21:22:45 | event_alum_save | 16689918 |
| 2013-10-3 21:22:45 | event_alum_save | 17126675 |
| 2013-10-3 21:22:45 | event_alum_save | 17996137 |
| 2013-10-3 21:22:45 | event_alum_save | 19530650 |
| 2013-10-3 21:22:45 | event_alum_save | 26025510 |
| 2013-10-3 21:22:45 | event_alum_save | 35955930 |
| 2013-10-3 21:22:45 | event_alum_save | 36016597 |
| 2013-10-3 21:22:45 | event_alum_save | 258738804 |
| 2013-10-3 21:22:45 | event_alum_save | 76382752 |
| 2013-10-3 21:22:45 | event_alum_save | 46642684 |
| 2013-10-3 21:22:45 | event_alum_save | 50168731 |
| 2013-10-3 21:22:45 | event_alum_save | 53358644 |
| 2013-10-3 21:22:45 | event_alum_save | 53773456 |
| 2013-10-3 21:22:45 | event_alum_save | 55752584 |
| 2013-10-3 21:22:45 | event_alum_save | 58143018 |
| 2013-10-3 21:22:45 | event_alum_save | 70409642 |

Fig. 4B

SYSTEMS AND METHODS FOR CLEANSING AUTOMATED ROBOTIC TRAFFIC

RELATED APPLICATIONS

The present application claims the benefit of U.S. Provisional Application No. 62/290,569, filed on Feb. 3, 2016, and is a continuation-in-part of and claims the benefit of priority to U.S. patent application Ser. No. 14/605,134, filed on Jan. 26, 2015, which claims the benefit of priority to U.S. Provisional Patent Application Ser. No. 61/931,973, filed on Jan. 27, 2014, the entirety of each is incorporated by reference herein.

TECHNICAL FIELD

Exemplary embodiments of the present disclosure relate to identifying robotic and/or bulk traffic, and cleansing data generated from robotic and/or bulk traffic.

BACKGROUND

Researchers often seek to identify important and interesting new discoveries in their fields, and then use these new discoveries as quickly as possible in their work. The task of making new discoveries is increasingly difficult as the volume of research literature increases exponentially. Traditional measures of research impact, such as citation counts, operate at low velocities, taking years to accrue, and may not provide enough information to researchers about newly published works. Instead, researchers are turning to usage and other alternative metrics ("altmetrics") to provide higher velocity indicators of interest to guide them, particularly in the pre-citation period, where a newly published work has not had time to accrue traditional measures of research impact. Providing these measures from aggregated or metadata databases is particularly challenging because usage is increasingly driven by automated machines—robotic traffic—that does not accurately reflect the interest or importance of individual research artifacts.

Within the academic and scientific literature space, one conventional approach to distinguishing between human and robotic traffic is to utilize pre-established identifications of non-human users, likely by way of IP addresses of servers deploying web-crawlers and other computer-implemented scripts. Research sessions linked to such IP addresses are flagged as non-human sessions and are removed from further analysis. Requiring pre-identification of non-human users is not a plausible or sustainable solution to robotic traffic due to the complexity of human and non-human interactions in these research sessions, where humans may, for example, utilize automated scripts in an ad hoc manner to complete repetitive tasks.

SUMMARY

Exemplary embodiments of the present disclosure provide for the ability to distinguish between automated and human usage/traversal in information retrieval system consisting of metadata and/or works (written or otherwise). Usage logs for metadata databases show a variety of information-seeking behaviors by both human and machine actors. To effectively interpret the usage logs, exemplary embodiments can mine the usage logs in a manner that carefully distinguishes various types of behavior and accurately selects the events from the usage logs that indicate a true level of research interest in a work from human users. Mining usage logs in accordance with exemplary embodiments of the present disclosure can advantageously provide indicators not only of current research interests, but also the emergence of new research priorities that will inform the future evolution of the science, technology, and scholarship.

Exemplary embodiments of the present disclosure advantageously provide for time-invariant quantity-based detection of robotic traffic and can use an extended set of events beyond query events and payoff events to detect robotic traffic including, for example, summary and view events. Embodiments of the time invariant quantity based approach to detecting robotic traffic described herein can promote efficient usage of physical computing resources by separating single query sessions from multi-query sessions and processing and evaluating single query and multi-query sessions in parallel and/or using distinct robotic traffic detection algorithms. Exemplary embodiments of the present disclosure can advantageously perform cross-session analysis to detect robotic traffic, which can be missed when analyzing sessions independently from each other. For example, software robots can be programmed to generate several sessions having one or more queries per sessions, and exemplary embodiments of the present disclosure can analyze multiple sessions simultaneously to detect such robotic traffic.

Exemplary embodiments of the present disclosure can utilize robotic behavior models, dynamic machine learning, and statistical analysis to train the robot traffic detection process. For example, embodiments of the time-invariant quantity-based approach can establish and/or modify threshold values and/or weighting values that can be used to discriminate between robotic traffic and traffic resulting from deliberate intentional human interactions based on robotic behavior models, dynamic machine learning, and statistical analysis.

Embodiments of the time-invariant quantity-based approach to detecting robotic traffic described herein overcomes problems associated with time-based detection of robotic traffic. As one example, exemplary embodiments of the present disclosure can reduce a quantity of robotic traffic that is generally undetected by time-based robotic detection approaches because unlike time-based detection approaches, the time-invariant quantity-based detection approaches of embodiments of the present disclosure are not susceptible to multi-user load delays. For example, the accurate logging of time events occur in a session or multiple session can be destroyed due to delays that are inherent in the architecture stack of time-based robotic detection approaches. As a result, a time-based approach to robotic traffic detection can miss robotic traffic. Because embodiments of the present disclosure do not rely on the time at which events occur, delays in logging the time at which events occur has no effect on the ability of embodiments of the present disclosure to identify and remove robotic traffic.

Exemplary embodiments of the present disclosure are directed to systems and methods that are capable of identifying, classifying, and cleansing of usage logs to remove those usage logs or portions thereof that are associated with automated software robot behavior from further analysis based on patterns and/or characteristics of data in the usage logs. A model of intentional behavior can be used to identify and classify usage logs based on a theory that human users that are interested in a particular work are likely to view a result list from a search query and navigate to and view individual results of interest (e.g., records or works) before taking additional steps of printing, sharing, and/or saving such individual results of interest.

In accordance with embodiments of the present disclosure, a method of cleansing data generated by one or more servers is disclosed. The data to be cleansed is generated in response to database interactions resulting from an automated software robot or script interacting with the one or more servers via a communications network. The method includes retrieving a usage log from a non-transitory computer-readable medium. The usage log includes log entries corresponding to events that occurred during one or more sessions between a user device and the one or more servers. The method also includes analyzing the log entries in response to execution of a traffic analyzer to determine a first quantity of log entries associated with a first type of event and a second quantity of log entries associated with a second type of event; executing the traffic analyzer to detect whether the log entries resulted from robotic traffic based on the first quantity of log entries associated with the first type of event and the second quantity of log entries associated with the second type of event; and, in response to detecting that the log entries resulted from robotic traffic, eliminating at least the log entries that resulted from robotic traffic.

In accordance with embodiments of the present disclosure, a system for cleansing data generated by one or more servers is disclosed. The data to be cleansed is generated in response to database interactions resulting from an automated software robot interacting with the one or more servers via a communications network. The system includes a usage log database and one or more servers. The usage log database includes usage logs associated with sessions between user devices and the one or more servers, and the usage logs include log entries corresponding to events that occurred during sessions between user devices and the one or more servers. The one or more servers are programmed to retrieve the usage logs from the usage log database; analyze the log entries in response to execution of a traffic analyzer to determine a first quantity of log entries associated with a first type of event and a second quantity of log entries associated with a second type of event; execute the traffic analyzer to detect whether the log entries resulted from robotic traffic based on the first quantity of log entries associated with the first type of event and the second quantity of log entries associated with the second type of event; and eliminate at least the log entries in the usage log that resulted from robotic traffic.

In accordance with embodiments of the present disclosure, a non-transitory computer-readable medium storing instructions is disclosed, wherein execution of the instructions by a processing device causes the processing device to retrieve the usage logs from a usage log database; analyze the log entries in response to execution of a traffic analyzer to determine a first quantity of log entries associated with a first type of event and a second quantity of log entries associated with a second type of event; execute the traffic analyzer to detect whether the log entries resulted from robotic traffic based on the first quantity of log entries associated with the first type of event and the second quantity of log entries associated with the second type of event; and eliminate at least the log entries in the usage log that resulted from robotic traffic.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying figures. In the drawings, like reference numerals refer to like parts throughout the various views of the non-limiting and non-exhaustive embodiments of the present disclosure, and wherein:

FIGS. 4A and 4B depicts a portion of exemplary usage logs in accordance with exemplary embodiments of the present disclosure.

DETAILED DESCRIPTION

Figure 1:
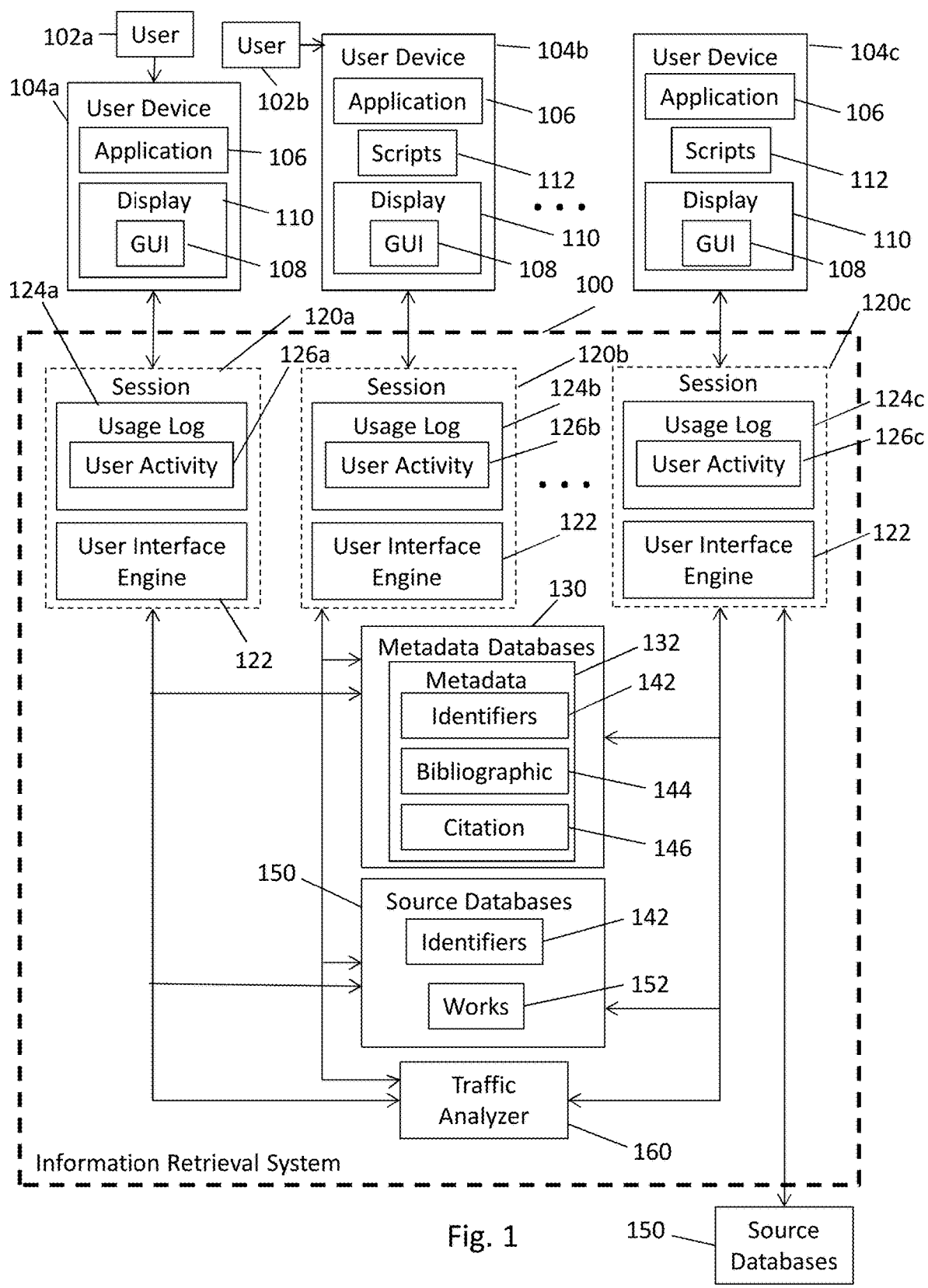
FIG. 1 is a block diagram depicting an information retrieval system in accordance with exemplary embodiments of the present disclosure.

Exemplary embodiments of the present disclosure are directed to distinguishing between data traffic resulting from software robots and data traffic resulting from human interaction. Exemplary embodiments of the present disclosure can observe, measure, and classify various user logs, and/or queries included therein, associated with data traffic based on user behavior (be they a human user or a "robotic" user) captured in the queries and/or user logs. Exemplary embodiments can cleanse the queries and/or usage logs so that the subset of queries and/or usage logs indicative of human behavior can be used to, for example, assign rankings, metrics, and other indicators to works identified in the usage logs (and in response to queries) which can enable subsequent discovery of the works based on the rankings, metrics, and/or indicators.

Exemplary embodiments of the present disclosure are based on a theoretical model of behavior under which it is assumed that when a user searches for content in one or more databases, the user reviews a summary list of results and generally views some of those results in the summary list before taking additional steps of printing, sharing, and/or saving such individual results of interest. For example, in an information retrieval system that provides a reference management environment, when a user downloads, shares, or prints works stored in one or more databases, it is likely that the user first viewed the content of the works.

Exemplary embodiments advantageously provide the ability to accurately indicate the interest and importance of new research at an earlier stage by enabling the creation of a host of metrics, indicators, and trend analyses that can aid in increasing speed of work of researchers and research managers, enabling them to invest their time and resource more efficiently. These metrics, indicators, and trend analysis can complement and/or replace the more traditional citation counts metrics.

As one non-limiting example, exemplary embodiments can discriminate between usage logs in an information retrieval system that provides a reference management environment, which includes a metadata database for written works, to exclude, remove, or purge usage logs (or individual queries included therein) that are indicative of robot traffic. Once the robot traffic has been detected and excluded, removed, or purged, exemplary embodiments of the present disclosure can use a remaining subset of queries and/or usage logs to create indicators of scientific interest expressed in the usage logs, which can provide an early indication of the direction that scientific research is taking and will take in the future. The metrics and indicators can include a set of work-level (e.g., article-level) metrics and indicators based on usage logs processed according to exemplary embodiments of the present disclosure. These indicators can provide scientists/researchers with more efficient and accurate guides to emerging scientific discoveries, and can result in faster innovation and research discovery.

Several terms are defined herein to aid in the description of exemplary embodiments.

As used herein, a "work" is a data structure containing expressions in the form of binary and/or alphanumeric characters, audio, images, video, and/or a combination thereof. For example, works can include computer or database files containing textual works, such as books, articles, poems, recipes, editorials, essays, patent, patent applications, datasheets, catalogues, treatises, legal opinions/decisions, case law, magazines or other periodicals, manuscripts, and papers presented, submitted and published by society, industry and/or professional organizations such as in proceedings and transaction publications, and the like; visual works, such as photographs, graphics, scanned documents, videos, and the like; and/or audio works, such as spoken word, music, and the like.

As used herein, a "work-level usage indicator" or a "work-level usage metric" refers to an indicator or metric that is specific to a usage of a particular work or a usage of metadata associated with the particular work such that the indicator or metric can be used to characterize the usage of the particular work and/or the metadata associated with the particular work.

As used herein, "intentionality" refers to an estimation of a degree to which a user's behavior is indicative of someone processing search results and works with purpose and/or deliberation.

As used herein, a "session" refers to a connection between two or more computing devices to facilitate interaction between the devices and/or an exchange of data between the two devices. A session can be established between first and second device in response to receiving credentials or log in information by the second device from a first device and can be terminated when the session times out, or is end by one or more of the devices associated with the session (e.g., in response to a logout).

As used herein, a "session event" or "post-query session event" refers to an action, operation, or task implemented during a session in response to search results returned by a query. Examples of session events can include payoff events, investment events, and summary/view events.

As used herein, a "payoff event" or "reward" refers to an act of a user (human or robotic) to save, print, share, read, link to, or otherwise engage with content (e.g., a work) identified in search results resulting from queries.

As used herein, a "summary event" refers to presentation of results of a query to a device and/or account associated with a user (human or robotic), where the presentation of results may or may not be rendered on a display. For example, presentation of results may include transmission of results (or portions thereof) from an information retrieval system to the device associated with the user, storing of the results by the information retrieval system in an account associated with the user, and/or providing instructions to render a list of results in a graphical user interface to be displayed by the device associated with the user. A summary event may include presenting one or more lists (e.g., a formatted data set having an ordered sequence) identifying works returned by an information retrieval system that may be available to a device associated with a user in response to a query. The list(s) can include, for example, portions of the works and/or metadata associated with works. A single query can result in one or more summary events. For example, an information retrieval system may be configured to present the results of a query in increments (e.g., ten at a time, twenty five at a time, fifty at a time), where a summary event can occur each time an increment of the results are presented to a user.

As used herein, an "investment" or "investment event" refers to a quantifiable effort exerted by a user prior to a payoff event. For example, a user that submits a search request and then iteratively refines the search request to ultimate achieve a payoff event has made an investment in the payoff event.

FIG. 1 is a block diagram depicting an information retrieval system 100 in accordance with exemplary embodiments of the present disclosure. In exemplary embodiments, the information retrieval system 100 can be implemented by one or more servers and one or more databases, which can communicate directly with each other and/or may communicate with each other via one or more communication networks. User devices 104a-c can interact with the information retrieval system 100 to establish communication sessions 120a-c, respectively. The user devices 104a-c can be computing devices (including a personal computer, a workstation, a tablet, a smart phone, a laptop, a server, and the like, configured to communicate with the information retrieval system 100 over one or more communication networks using one or more communication protocols.

The sessions 120a-c persist for a period of time (e.g., from the time a user logs into the information retrieval system 100 to the time the user logs out of the information retrieval system 100 or until the session times out). While sessions 120a-c are illustrated as example sessions in FIG. 1, in exemplary embodiments, a single user or user device can generate multiple sessions over time (e.g., by logging into the system 100 multiple times). The sessions for a single user can overlap in time such that a single user can have multiple sessions in use at the same time. The sessions 120a-c can facilitate bidirectional communication between the information retrieval system 100 and the user devices 104a-c, and can maintain a state of the communication. For example, the information retrieval system 100 can save information about the session history and/or can instruct and/or control the user devices 104a-c to save information about the session history (e.g., in the form of tokens and/or cookies) to enable the communication. In some embodiments, the session history, or portions thereof, of the sessions 120a-c can be stored in usage/session logs 124a-c, as described herein, to capture user activities 126a-c. While the usage/session logs 124a-c can be contained in a single data structure, in exemplary embodiments, the entries in the usage/session logs can be stored in separate data structures. For example, queries can be stored in a query history, and post-query session events (e.g., summary/view and payoff events) can be stored in a post-query history, where each entry in each history is associated with a user identifier, a source identifier, and a session identifier such that a usage/session log is an aggregate of those events in the histories that correspond to the same user identifier, source identifier, and session identifier. In exemplary embodiments, the sessions 120a-c can each be associated with a user identifier that identifies the user that logged in to establish the session, a source identifier (e.g., an Internet Protocol (IP) or Media Access Control (MAC) address) used to access the system 100 during the session, and a unique session identifier that can be used by the information retrieval system 100 to distinguish between the sessions 120a-c and identify the usage logs 124a-c corresponding to the sessions 120a-c, respectively. A user identifier can be a string of alphanumeric characters that uniquely identifies a user account that initiated a session.

The user devices 104a-c can each include an application 106, such as a web browser or a stand-alone application specific to the information retrieval system 100, which can be executed by the user devices 104a-c (e.g., by a processing device) to render one or more graphical user interfaces (GUIs) 108 on a display device 110 associated with each of the user devices 104a-c. The GUIs 108 displayed to users can include data entry areas to receive information from the user; user-selectable elements or areas that can be selected by the user to cause the information retrieval system 100 to perform one or more operations, functions, and/or processes; and/or can include data outputs to display information to users. In exemplary embodiments, the GUIs 108 can enable navigation and/or traversal of the information retrieval system 100.

As shown in FIG. 1, interactions between the user devices 104a-c and the information retrieval system 100 can have varying degrees of automation. As an example, a user 102a can interact with the user device 104a via the GUIs 108 to enter search requests to be submitted to the information retrieval system 100 and the user 102a can determine what actions are taken with respect to the results of the search requests.

As another example, user device 104b can be programmed with one or more software scripts 112 that can be executed by the user device 104b to at least partially automate an interaction with the information retrieval system 100 such that at least one or more search requests and/or one or more actions with respect to the results of the search requests are performed without intervening human interaction with the user device 104b. The scripts 112 may be used by the user 102b to facilitate interaction with the information retrieval system 100 so that the user 102b can efficiently, effectively, and iteratively search for and review (or perform other actions with) the results of a search request.

As another example, the user device 104c can be programmed with one or more software scripts 114, which can be executed by the user device 104c to automate an interaction with the information retrieval system 100 such that one or more search requests and one or more actions are taken with respect to the results of the search requests without intervening human interaction. The scripts 114 of user device 104c are typically configured to perform repetitive tasks, such as a large quantity of search requests or downloads, and to perform the same or similar action with respect to the results of the search requests (e.g., save the results). The scripts 114 implemented by the user device 104c are referred to herein as "software robots" or "software bots."

While most interactions can be of value when attempting to quantify and qualify metrics and/or altmetrics associated with works, it has been determined herein that interactions between user devices and the information retrieval system 100 using software robots where there is little or no human involvement are generally of little to no value in accurately quantifying or qualifying metrics and/or altmetrics. Interactions with the information retrieval system 100 resulting from software robots generally provided little to no value because the utilization of these software robots or bots can artificially increase a quantity of times content from the databases (e.g., works, written or otherwise) is downloaded, saved, shared, viewed, and/or printed, which may not reflect a value of the content to a human user since the human user was not involved in performing or requesting those actions. Thus, these software robots can negatively impact the ability of the information retrieval system 100 to determine and/or identify accurate metrics or altmetrics about the content of the databases.

The information retrieval system 100 can implement one or more instances of a user interface engine 122 for the sessions 120a-c (e.g., an instance for each of the sessions 120a-c), and the instances of the user interface engine 122 can be programmed to transmit instructions to the user devices 104a-c that can be used by the user devices 104a-c to render the GUIs 108 on the display devices 110. The users 102a-b and software scripts 112 and 114 can interact with the information retrieval system 100 using the GUIs 108 to perform one or more activities in information retrieval system 100. As one example, the user 102a, the user 102b, the scripts 112, and/or the scripts 114 can construct search requests consisting of one more search terms via the GUIs 108, and may submit the search requests to the information retrieval system 100, which can construct database queries including the search terms to search one or more of the databases for information corresponding to, or associated with, the search terms of the search requests. In some embodiments, users 102a-b and the scripts 112 and 114 can interact with the information retrieval system 100 without interacting with the GUIs 108. The one or more databases can return information in response to the database queries, and the information retrieval system 100 can provide the information to the requesting user device. During the session 120a-c, the users 102a-b, the scripts 112, and/or the scripts 114 can generate multiple search requests, e.g., to refine searches based on results from previous queries, search for different information, and/or can generate multiple search requests for any other reasons.

In exemplary embodiments, the one or more databases that can be searched in response to the search requests can include one or more metadata databases 130 and source databases 150. The source databases 150 can be configured to store source content or data and the metadata databases 130 can be configured to store metadata associated with the source content or data stored by the source databases 150. In exemplary embodiments, the source content or data can include any suitable content or data that may be stored in a database and retrieved in response to one or more database queries, and the metadata can generally be any metadata related to the source content or data. In some embodiments, the information retrieval system 100 can be configured to retrieve metadata from the metadata databases 130 in response to search requests received from the user devices 104a-c. The information retrieval system 100 can transmit the metadata to the user devices 104a-c to provide the user devices 104a-c with the results of the search requests. Based on the metadata returned in response to the search requests, the user devices 104a-c (in response to a human user or a software script) can request that the information retrieval system 100 retrieve the source content or data associated metadata.

In some embodiments, the information retrieval system 100 can provide a reference management environment in which the content of the databases 130 and 150 can include works (written or otherwise), as well as bibliographic information, citation information, and/or other metadata. In some embodiments, the databases 130 and 150 can include content that relates to legal, research, financial, scientific, medical health-care written works, as well as any other suitable content. As one non-limiting example, the databases 130 and 150 can include content associated with scientific articles that are published by one or more publishers. While some embodiments of the databases 130 and 150 may be described herein with respect to written works (e.g., books, articles, poems, recipes, editorials, essays, patent, patent applications, datasheets, catalogues, treatises, legal opinions, case law, magazines or other periodicals, manuscripts, and papers presented, submitted and published by society, industry and professional organizations such as in proceedings and transactions publications, and the like), those skilled in the art will recognize that exemplary embodiments are not limited to databases associated with written works. For example, in some embodiments of the present disclosure, the databases 130 and/or 150 can store information and content for audio works, visual works, audio-visual works, and/or any other suitable types of works. More generally, exemplary embodiments of the present disclosure can be implemented such that a metadata database includes metadata associated with source content stored in a source database.

As described herein, the metadata databases 130 can include metadata 132 associated with source content, such as one or more works 152 stored in the source databases 150. In some embodiments, the metadata databases 130 can be implemented as authority databases in which unique (alpha-numeric) identifiers 142 (e.g. document identifiers) are assigned to data structures including source identifying information, such as citation information 144 and bibliographic information 146. The metadata databases 130 can be searched based on this source identifying information (e.g., the citation information 144 and/or bibliographic information 146) and/or the unique identifiers 142 associated with the data structures containing source identifying information (e.g., the citation information 144 and/or the bibliographic information 146). The unique identifiers 142, the citation information 144, and/or bibliographic information 146 can be utilized by the embodiments of the information retrieval system 100, which provide a reference management environment, to consistently, uniquely, and unambiguously return one or more of the unique identifiers 142, the citation information 144, and/or the bibliographic information 146 in response to search queries specified by the user.

In some embodiments, the citation information 144 and/or bibliographic information 146 can include one or more works that include citation relationships, abstracts, links to works, classification data, authorship, titles, publishers, publication year, and other metadata associated with works stored in the source databases 150. The metadata databases 130 can include cross references and/or logical linkages to other data structures including related works and/or similar works, e.g., based on authorship, titles, publishers, abstracts, publication year, and the like. Some examples of metadata databases 130 can include, for example, the Web of Science, Web of Knowledge, Cortellis, Biological Abstracts, and/or Thomson Reuters Innovation provided by Thomson Reuters, as well as, PubMed from the National Center for Biotechnology Information (NCBI), AMJUR, Crossref.org, JSTOR from ITHAKA, and/or BioOne.

In accordance with embodiments of the information retrieval system 100 that provide a reference management environment, the metadata databases 130 can be configured to include cross references and/or logical linkages to other data structures including trending works by field or topic, forecasted highly citied works by field or topic, recommended works by field or topic, and the like, e.g., based on authorship, titles, publishers, abstracts, publication year, a topic or field associated with the works, metrics and/or altmetrics generated by a traffic analyzer 160 according to embodiments of the present disclosure described herein, and/or based on any other suitable information. In some embodiments, the data structures that include trending works by field or topic, forecasted highly citied works by field or topic, and/or recommended works by field or topic can be stored in the metadata databases 130, the source databases 150, and/or in any other suitable databases that can be accessed and/or modified by the traffic analyzer 160.

As described herein, the source databases 150 can store source content, such as the one or more works 152, that can be retrieved in response to one or more operations of the information retrieval system 100 using for example, the unique identifiers 142 associated with the works 152. In exemplary embodiments, the source databases 150 can be included in the information retrieval system 100 and/or can be external to the information retrieval system 100. For embodiments of the information retrieval system 100 that provide a reference management environment, the works 152 can include, for example, written, audio, and/or audio-visual works related to one or more fields and/or topics. For example, in some embodiments, the works 152 stored in the source databases 150 can include written works related to legal, research, financial, scientific, medical, health-care topics or fields. Works 152 (e.g., records or documents)

retrieved from the source databases 150 during any of the sessions 120*a-c* can be rendered on the display device 110 of the user devices 104*a-c* via an instance of the user interface engine 122; saved to a user-specific personal reference library corresponding to a user's account for future reference/use via an instance of the user interface engine 122; printed to a local or networked printer associated with the user devices 104*a-c* via an instance of the user interface engine 122; shared/sent via e-mail, text, or other mode of communication on behalf of the users 102*a-c* via an instance of the user interface engine 122; and/or the information retrieval system 100 can perform one or more further operations upon retrieval of one of the works 152 whether automatically or in response to input received from one or more of the users 102*a-b* via the GUIs 108.

The instances of the user interface engine 122 of the information retrieval system 100 can create and maintain the usage/session logs 124*a-c* for each session 120*a-c* established between user devices 104*a-c* and the information retrieval system 100, respectively, as records in a usage log database. The usage logs 124*a-c* are data structures specific to the sessions 120*a-c*, respectively, and capture interactions between the information retrieval system 100 and the user devices 104*a-c* (e.g., in response to inputs via the GUIs 108) as well as information about the interactions including a date and time of the interaction (e.g., a time stamp), an Internet Protocol (IP) address of the user devices 104*a-c*, a media access control (MAC) address, a user identifier (e.g., a username) associated with the user account through which the sessions 120*a-c* were established. The interactions captured by the usage logs 124*a-c* can include queries and post-query session events that occurred during the sessions 120*a-c* corresponding usage logs 124*a-c*. For example, the usage logs 124*a-c* can include session events, such as summary/view events (e.g., presentation of results of queries, selections of links in the search results to view source content, such as a work (e.g., a full text version of article) identified in search results, viewing of metadata, such as bibliographic information in the search results), and/or pay-off events (e.g., downloading of a work identified in the search results, printing of a work identified in the search results, sharing (via e-mail) a work identified in the search results, and the like). The usage logs 124*a-c* can track (human or robot) user activities during the sessions 120*a-c* such that the information retrieval system 100 can create and maintain a usage log for each user device and/or user, for each session that is established by the user device and/or user. For example, each user log can be associated with a source identifier (e.g., IP address, MAC address), a user identifier (e.g., username, account identifier), and/or a session identifier.

In exemplary embodiments, the usage logs 124*a-c* can include a set of operations performed in the information retrieval system 100 that are associated with each other by a session identifier. The usage logs can include network traffic generated between the users 104*a-c* and the information retrieval system 100. The network traffic can include search requests submitted to the information retrieval system 100 by the user device 104*a-c*, actions performed by the information retrieval system 100 in response to queries and/or instructions received from the user devices 104*a-c*, and/or any other suitable information. For example, in addition to receiving search requests including search terms, the information retrieval system 100 can receive instructions to perform one or more actions with respect to a list of results returned by the databases 130 and 150 in response to database queries including the search terms. The actions that can be performed with respect to the results can include, but are not limited to, retrieving source content, such as one or more of the works (e.g., records or documents) included in the list of results, saving one or more of the works to a personal user library associated with an account of the user, making one or more of the works available for download by the user devices 104*a-c*, facilitate printing of one or more of the works, facilitate sharing of one or more of the works (e.g., by e-mail or other mode of communication), opening one or more of the works (e.g., instructing the GUIs 108 of the requesting user device to render one or more of the works), and/or can include any other suitable actions that can be performed with respect to the results.

The traffic analyzer 160 process a set of usage/session logs (e.g., the usage logs 124*a-c*) to cleanse automated robotic traffic from the set of usage logs at a query-level, a session-level (usage log level), a source-level (e.g., based on IP addresses and/or MAC addresses), and/or a user level (e.g., based on user identifiers) based on one or more relationships of events from sessions that are captured as log entries in the usage logs. As one example, the traffic analyzer can utilize time-invariant quantity-based robotic detection to detect robotic traffic, can utilize time-based robotic detection to detect robotic traffic, and/or can use a combination of time invariant quantity based detection and time-based detection. The traffic analyzer 160 can generate one or more work-level usage metrics and/or altmetrics based on the events included in user logs associated with human interaction (as opposed to robotic traffic). These metrics and/or altmetrics can be used by the traffic analyzer 160 to generate recommendations of source content, such as works, to a user based on search requests submitted by the user, works viewed by the user, works saved by the user, works printed by the user, works shared by the user (e.g., e-mailed to others); identify trending topics, fields, or works; rank works in a specified field or for a specified topic; and/or to forecast which works will likely be highly cited by other works.

In an exemplary operation of embodiments of the information retrieval system 100 configured to provide a reference management environment, upon receipt of a search request, the user interface engine 122 can construct one or more database queries that can be used to retrieve metadata and/or bibliographic data associated with one or more articles stored in a source database 150. The user interface engine 122 can also record an entry in the usage log for the current session providing the search request and search terms received by the environment 100 and can also record a date and time at which the search request was received. The database queries can be submitted to the metadata databases 130, and the databases 130 can return, as results to the search request, metadata and/or bibliographic data of articles corresponding to or associated with the search terms included in the search request. The results can be provided to the requesting user device and may be displayed on the display device 110 via the GUIs 108 as a list of the articles corresponding to, or associated with, the search terms included in the search request, where each article identified in the list is summarized using the metadata and/or bibliographic data returned by the databases 130. In exemplary embodiments, the results can be displayed in segments such that subsets of the results are provided sequentially. As an example, a summary page can be rendered on the display via the GUIs 108 that include a list of the first ten results, the user can interact with one or more of the first ten results. When the user wishes to view the next ten results, the user can select a next page link. In response to selection of the next page link, the information retrieval system 100 can instruct the GUIs 108 to render a list of the next ten results on the display, and the user can interact with the next ten results via the GUIs 108. The user can continue to view the results increments of ten until there are no more results to view. Each time a segment of the list of results in presented, accessed, viewed, and/or incremented, a summary event can be recorded in the usage log associated with the session. While increments of ten have been used to illustrate an exemplary embodiment of the present disclosure, exemplary embodiments of the present disclosure can utilize an increment of results and/or can allow a user to configure the increment.

One or more actions can be taken by the user device (either at the instruction of user or a software script) with respect to the articles included in the lists of results. For example, if a human user is reviewing the search results, the user may select one of the articles included in the list to retrieve the full text version of the article (i.e. the actual article) from one of the source databases 150 and/or may generate another search request that includes refined search terms, which are informed by the previous results and/or any articles identified in the previous results that were retrieved from the source database 150. In response to an action that causes an article identified in the list to be retrieved from one of the source databases 150, the user interface engine 122 can add an entry to the usage log identifying the article that was retrieved as well as the data and time that the article was retrieved. In exemplary embodiments, the log entry can identify the article by a unique document identifier, such as a unique document identifier maintained in the metadata databases 130 for the article. Likewise, when another search request is submitted, the user interface engine 122 can add another entry to the usage log identifying the search request and search terms as well as the date and time that the search request was received. The user may continue to submit search requests and review the results until the session terminates, and the user interface engine can continue to update the usage log with log entries in response to the user's interaction with the information retrieval system 100.

While some embodiments of the information retrieval system 100 are described herein as providing a reference management environment including databases that store works (written or otherwise) and metadata associated with the works, exemplary embodiments of the present disclosure are not limited to such reference management environments. Rather, exemplary embodiments of the information retrieval system cover all alternatives, modifications, and equivalents as included within the spirit and scope of the present disclosure. Furthermore, while the traffic analyzer 160 has been illustrated as being a component of the information retrieval system 100, in exemplary embodiments of the present disclosure, the traffic analyzer can be a stand-alone component separate and distinct from the information retrieval system and/or can be incorporated into other systems and/or environments.

Figure 2:
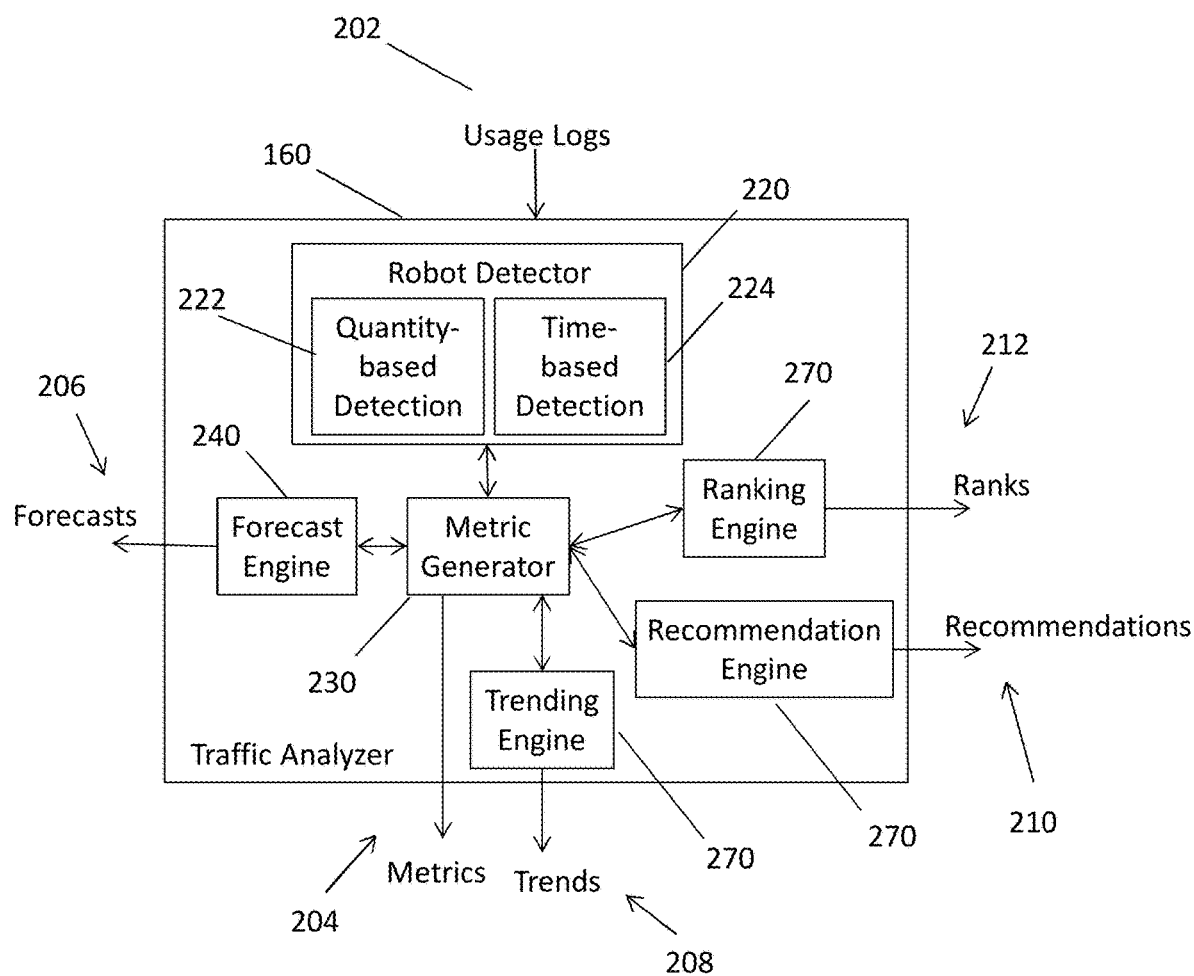
FIG. 2 is a block diagram of an exemplary embodiment of the traffic analyzer in accordance with the present disclosure.

FIG. 2 is a block diagram of an exemplary embodiment of the traffic analyzer 160 in accordance with the present disclosure. The traffic analyzer 160 can include a robot detector 220, a metric generator 230, a forecast engine 240, a trending engine 250, a recommendation engine 260, and a ranking engine 270. The traffic analyzer 160 can receive usage logs 202 as an input and outputs work-level usage metrics/altmetrics 204, forecasts 206, trends 208, recommendations 210, and ranks 212 based on the content of the usage logs 202. While exemplary embodiments of the traffic analyzer 160 are described as defining work-level usage metrics/altmetrics for works identified in the usage logs 202, exemplary embodiments of the traffic analyzer 160 described herein can generally generate content-level usage metrics/altmetrics for source content identified in usage logs or equivalents thereto.

The robot detector 220 can be programmed to evaluate the content of the usage/session logs 202 using time-invariant quantity-based detection 222 and/or time-based detection 224 to: detect robotic traffic in the queries identified in the usage logs 202; detect robotic traffic in and/or across the sessions from which the usage logs were generated; detect robotic traffic associated with the source identifiers (e.g., IP address, MAC address) for which the usage logs were generated, and/or detect robotic traffic associated with the user identifiers for which the usage logs 202 were generated as being based on human behaviors or automated robot behavior. To detect robotic traffic, the robot detector 220 determines whether the traffic resulted from human interaction or from bulk or robotic traffic based on session events captured as entries in the usage logs and a relationship between the sessions events. The relationship can be based on the types of session events that are captured (e.g., summary events, investment events, payoff events), the quantity of events or quantities of different event types that are captured, a timing between events, and the like.

Figure 11:
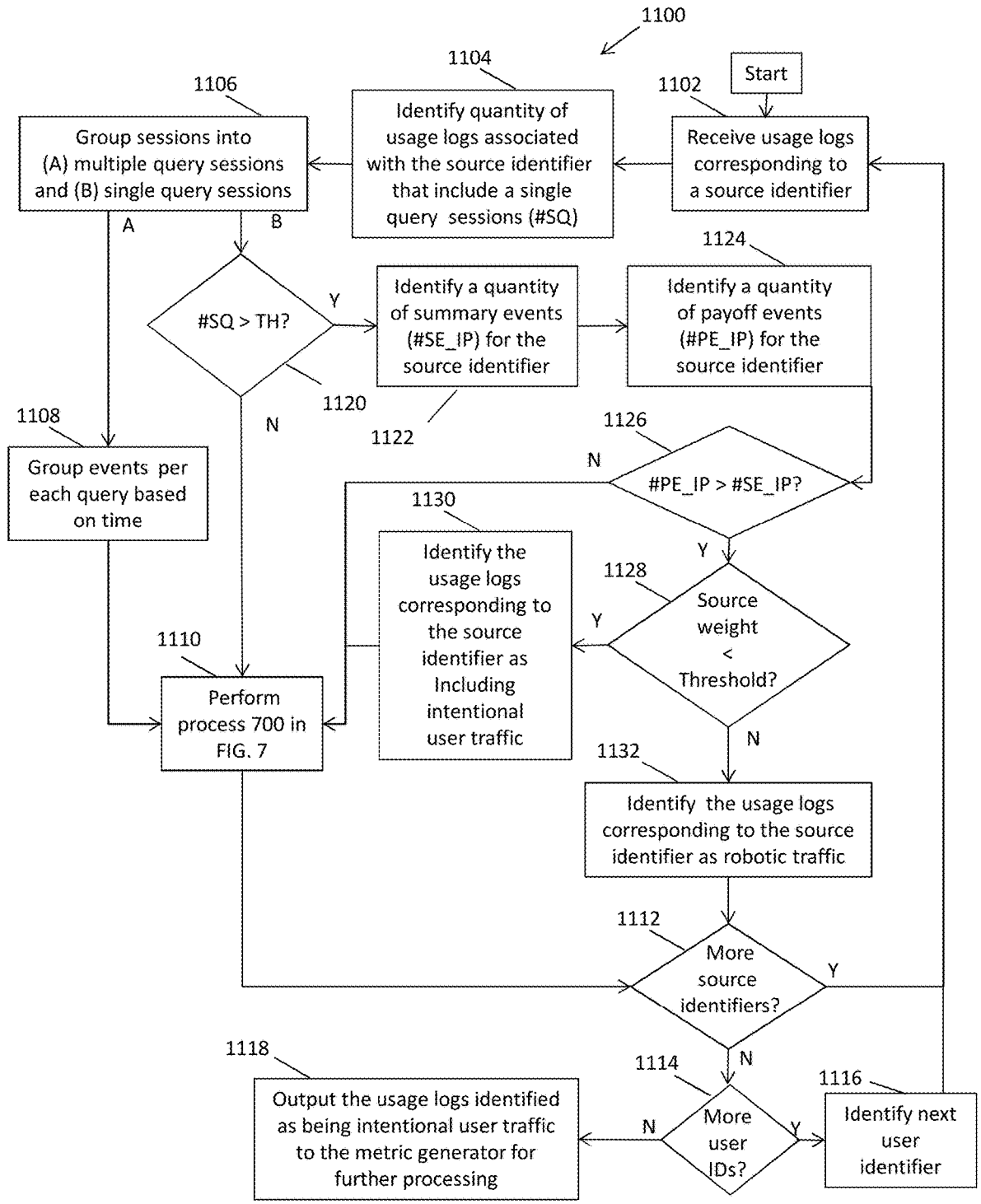
FIG. 11 is a flowchart of another exemplary quantity-based detection process for detecting robotic traffic at the source-level based on events captured in usage logs associated with source identifiers.
Figure 12:
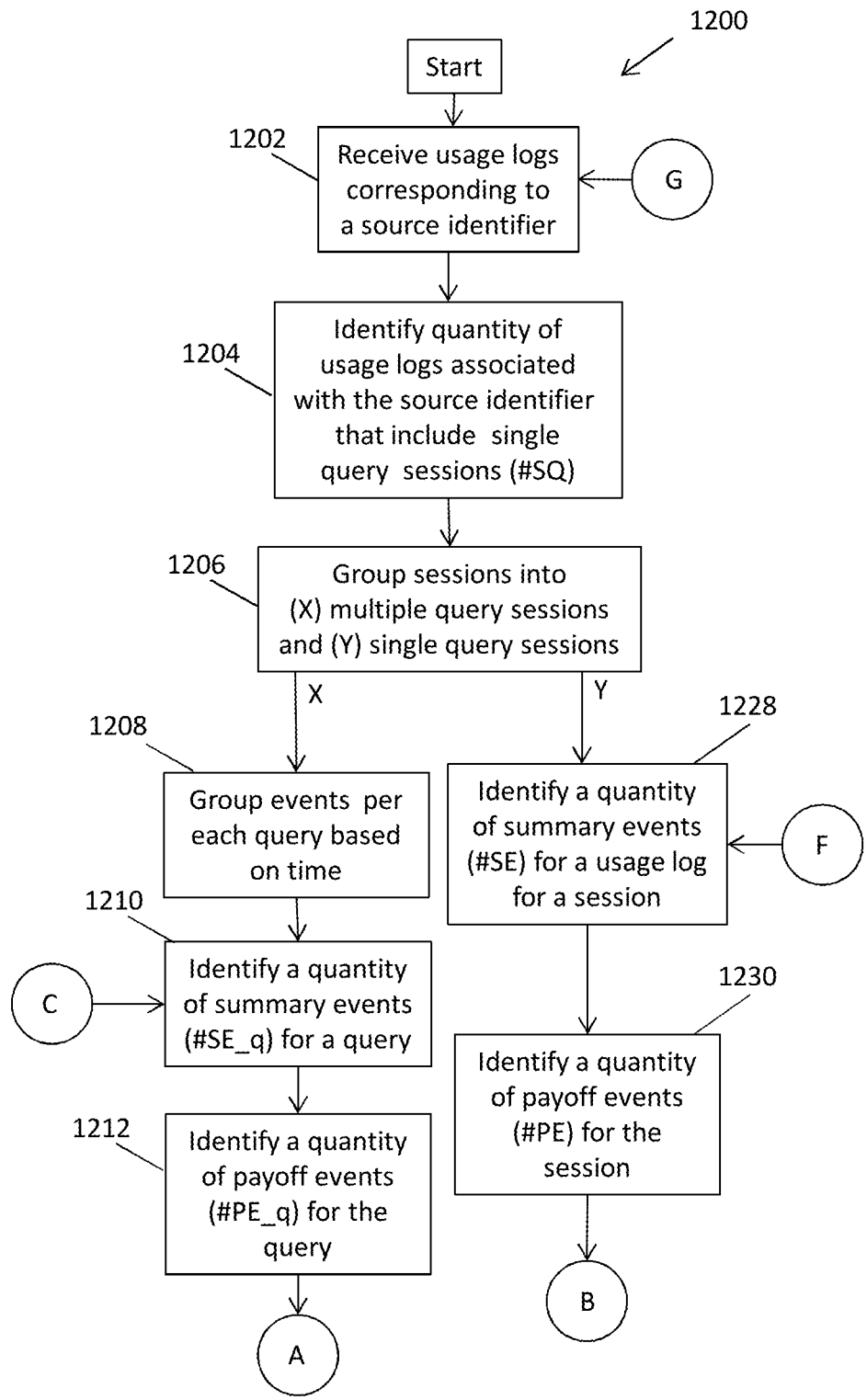
FIG. 12 is a flowchart of another exemplary quantity-based detection process for detecting robotic traffic at the source-level based on events captured in usage logs associated with source identifiers.
Figure 12:
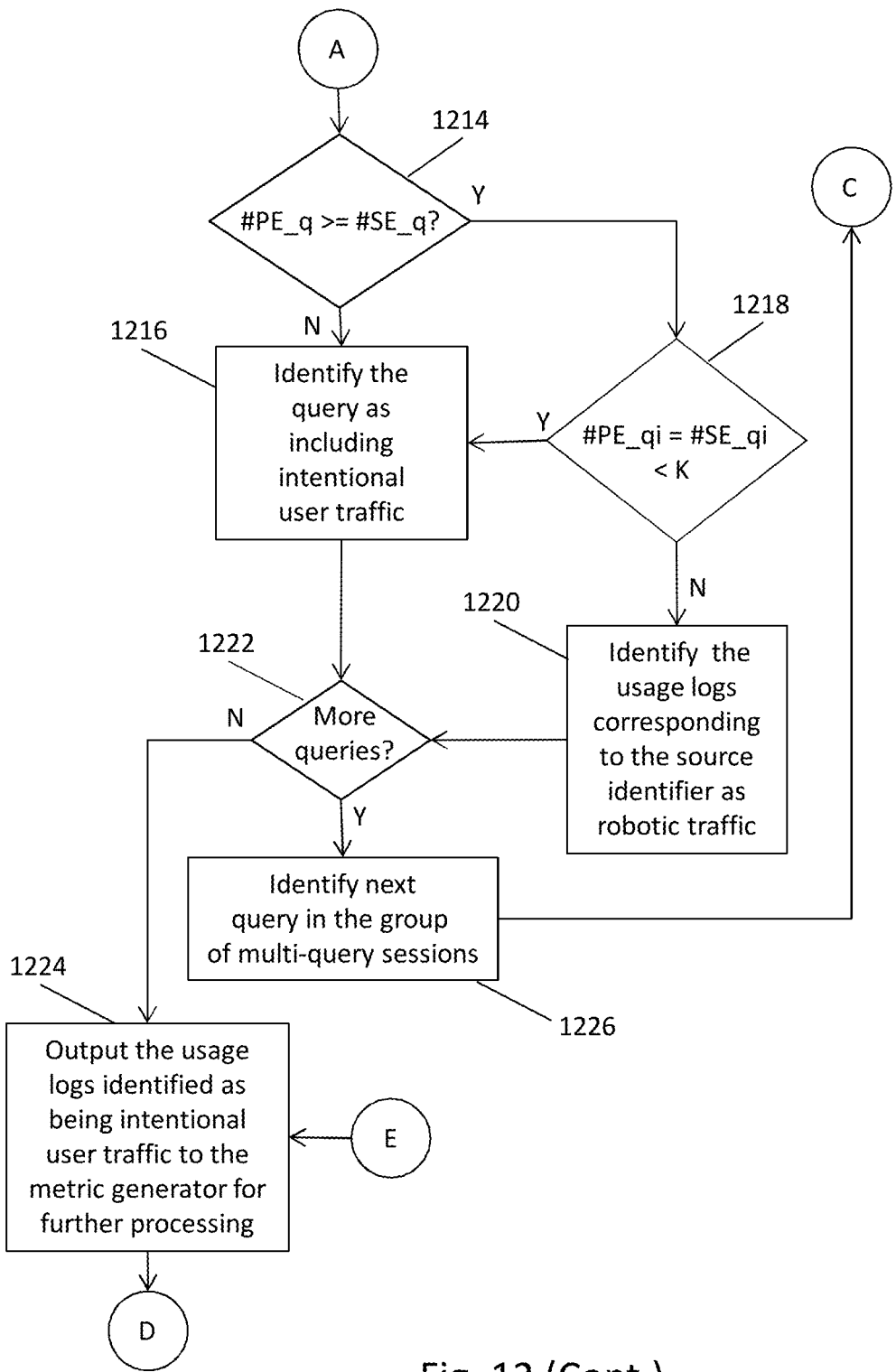
Figure 12:
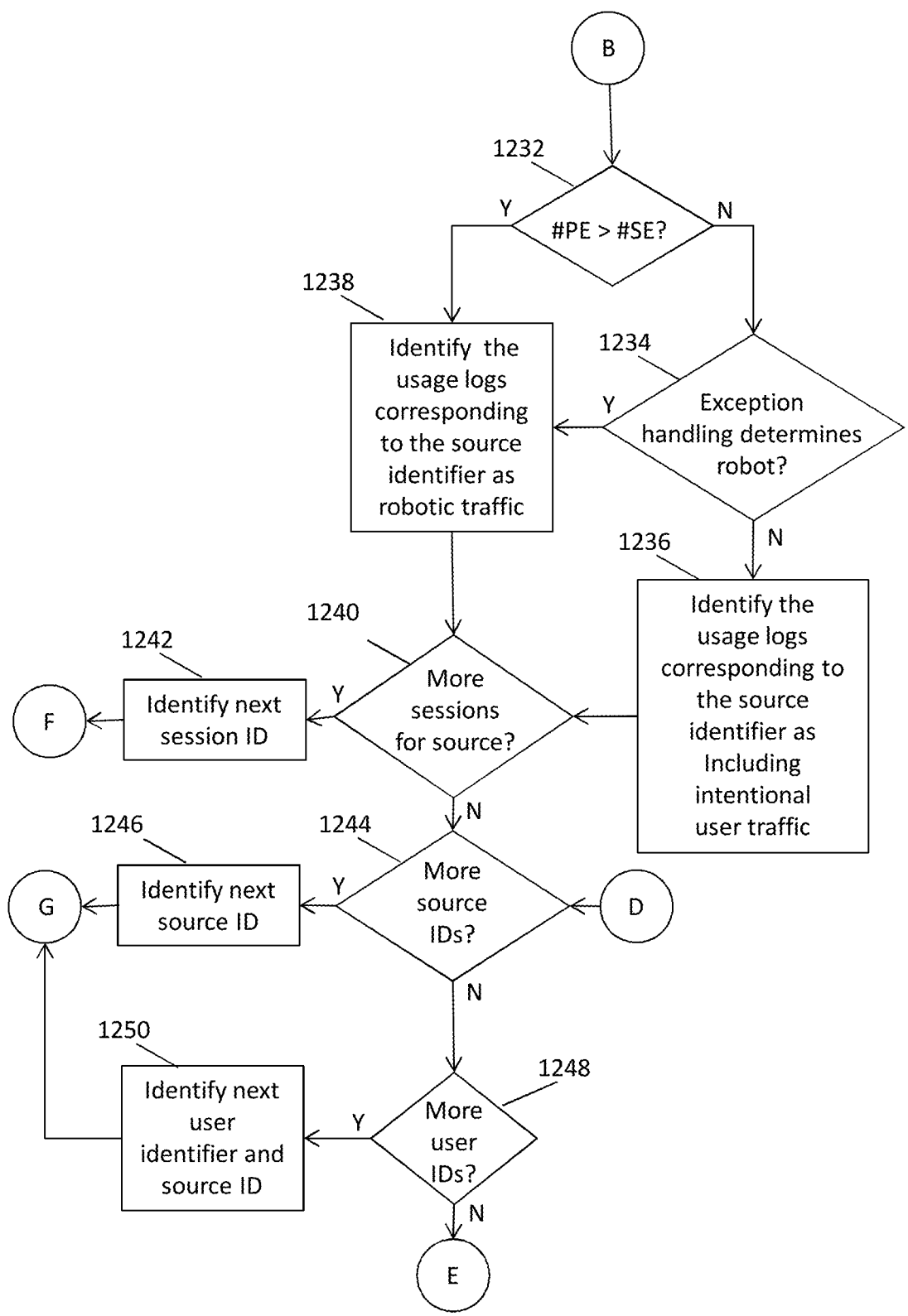
Figure 13:
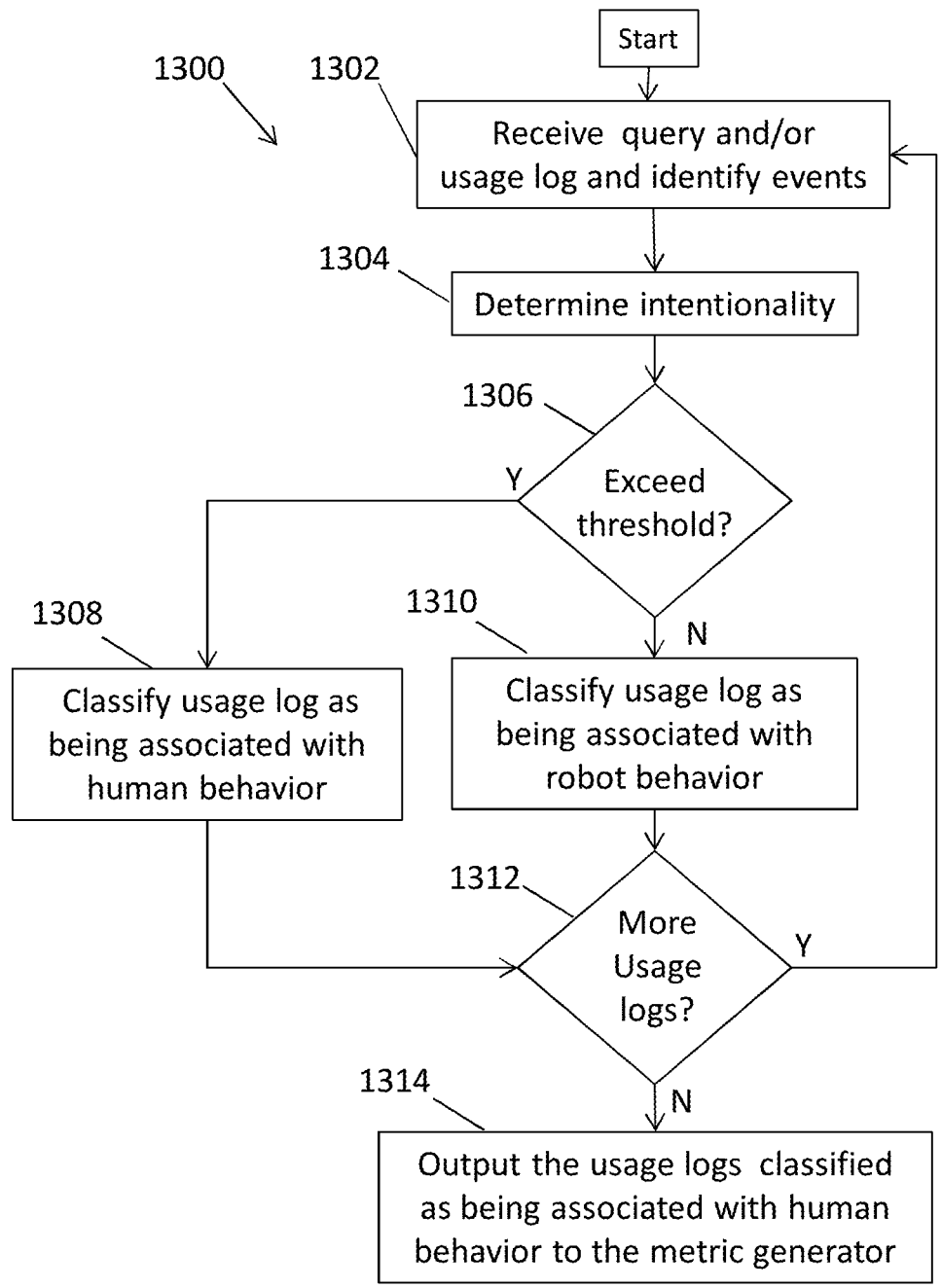
FIG. 13 is a flowchart illustrating another exemplary process for distinguishing between usage logs indicative of human behavior and usage logs indicative of automated software robot behavior in an information retrieval system.

As one example, the robot detector 220 processes each usage log 202 to detect robot traffic in the usage logs 202 based on a frequency of events identified in each usage log (e.g., a quantity of summary events, a quantity of payoff events) using the quantity-based detection 222 (e.g., as shown in FIGS. 7-12), based on a time between one or more types of events identified in each usage log using time-based detection 224 (e.g., as shown in FIG. 13), and/or a combination thereof. For the quantity-based detection 222, the robot detector 220 can detect robotic traffic based on, for example, a relationship between a quantity of a first type of events including summary/view events and a quantity of a second type of events including payoff events, and for the time-based detection 224, the robot detector can detect robot traffic based on the time between one or more types of events.

Additionally, or in the alternative, for the time-based detection 224, the robot detector 220 can determine the extent to which the time between one or more types of events is regular (as opposed to generally random), which can also be indicative of software robot behavior. For example, usage logs for which a time between events is substantially identical can be classified as corresponding to automated software robot behavior. Threshold values for the frequency/quantity of events and/or the time between one or more types of events can be specified (e.g., based on historic data and/or training data) such that if the frequency/quantity of events and/or the time between one or more types of events exceed the threshold(s), the robot detector 220 can determine that the traffic associated with the events, queries, usage logs, user source identifiers, and/or user identifiers as corresponding to automated software robot behavior. Using the quantity-based detection 222 and/or the time-based detection 224, the robot detector, can identify, for example, a first subset of usage logs and/or queries that corresponds to traffic generated based on human interaction and a second subset of usage logs and/or queries that corresponds to bulk traffic or traffic generated by an automated software robot. While the robot detector has been illustrated as being a component of the traffic analyzer 160, in exemplary embodiments of the present disclosure, the robot detector can be a stand-alone component separate and distinct from the traffic analyzer and/or can be incorporated into other systems and/or environments.

The time-invariant quantity-based detection 222 can use a relationship between quantities of payoff events (e.g., a first type of event) and quantities of summary/view events (e.g., a second type of event) to detect robotic traffic. Embodiments of the time-invariant quantity-based detection 222 can promote efficient usage of physical computing resources by separating single query sessions from multi-query sessions and processing and evaluating single query and multi-query sessions in parallel and/or using distinct robotic traffic detection algorithms. The time invariant quantity based detection 222 can advantageously perform cross-session analysis to detect robotic traffic. For example, software robots can be programmed to generated several sessions and one or more queries per sessions, and exemplary embodiments of the present disclosure can analyze multiple sessions simultaneously to detect such robotic traffic.

Robotic behavior models, dynamic machine learning, and statistical analysis can be implemented by the quantity-based detection 222 to train the robot traffic detection process. For example, embodiments of the time-invariant quantity-based detection 222 can establish and/or modify threshold values and/or weighting values that can be used to discriminate between robotic traffic and traffic resulting from deliberate intentional human interactions based on robotic behavior models, dynamic machine learning, and statistical analysis.

Embodiments of the time-invariant quantity-based detection can overcome problems associated with time-based detection of robotic traffic. As one example, exemplary embodiments of the present disclosure can reduce a quantity of robotic traffic that is generally undetected by time-based robotic detection approaches because unlike time-based detection approaches, the time-invariant quantity-based detection 222 utilized by the robot detector 220 is not susceptible to multi-user load delays. For example, the accurate logging of time events occur in a session or multiple session can be destroyed due to delays that are inherent in the architecture stack of time-based robotic detection approaches. As a result, a time-based approach to robotic traffic detection can miss robotic traffic. Because embodiments of the time-invariant quantity-based detection 222 do not rely on the time at which events occur, delays in logging the time at which events occur has no effect on the ability of embodiments of the present disclosure to identify and remove robotic traffic.

The metric generator 230 can receive the subset of usage logs and/or queries, which have been cleansed of automated robotic traffic based on the detection by the robot detector 220. The subset of usage logs and/or queries identified by the robot detector 220 includes usage logs that are indicative of human behavior. The metric generator 230 can generate one or more work-level (e.g., article-level) metrics and/or alt-metrics (e.g., metrics and/or altmetrics associated with a specific article) based on the content of the subset of usage logs 202, which can be output from the metric generator as metrics 204. As described herein, the usage logs can include events associated with the retrieval and/or use a work identified in search results, and the log entries associated with these events can include a unique identifier associated with the work that can be used by the metric generator 230 to generate work-level metrics.

The metric generator 230 can generate and output a work-level usage indicator, based on the content of the subset of the usage logs 202 and/or queries therein, that provides a running total of times a work was retrieved from a source database in a specified period of time, where the retrieval of the work can be performed to allow a user to act to view the work, print the work, download the work, link to the work (e.g., to cite the work in the user's own work), and/or share the work (e.g., via e-mail or other suitable modes of communication). In some embodiments, the acts performed by or on-behalf of the user in the usage logs can be weighted such that some acts receive more emphasis than other acts. As one non-limiting example, greater weight can be given to the act of viewing the work and linking to the work and less weight can be given to printing and sharing the work. Another work-level usage indicator that can be generated by the metric generator 230 can include a ratio of the number of times a work is shared to a number of times the work is viewed within a specified time period. Another work-level usage indicator that can be generated by the metric generator 230 is a most viewed works metric, for example, with a specific subject category, in a specified period of time to identify the most interesting articles in a publisher-neutral fashion. Another work-level metric that can be generated by the metric generator 230 can include a most frequently viewed works metric for one or more fields or topic, e.g., by determining usage patterns of a work during a defined period of time whose usage exceeds those of its peers.

The forecast engine 240 can receive one or more of the work-level metrics 204 generated by the metrics generator 230 for queries and/or usage logs over a specified time period and generate one or more forecasts 206 that can be output by the traffic analyzer 160. As one non-limiting example, the forecast engine 240 can receive a citation history of works (e.g., a number of times that the work was link to by other works) over a specified period of time. The forecast engine 240 can determine a trajectory of the citations of the works, e.g., based on a slope of the citation history over the specified time period, where the slope can be indicative of a rate at which the works are being cited. The forecast engine 240 can use the slope to extrapolate forecasted number of citations that the works are likely to receive at a future time. The forecast engine 240 can then receive a work-level usage indicator corresponding to a quantity of times a work was retrieved from a source database over a specified period of time (e.g., a retrieval history). The forecast engine 240 can determine a trajectory of the retrieval history, e.g., based on a slope of the over the specified time period, where the slope can be indicative of a rate at which the work is being retrieved. The forecast engine 240 can use the slope to extrapolate forecasted number of retrieval that the work is likely to receive. The retrieval and citation histories can then be correlated to forecast the number of citations the work is likely to receive, based on the number of retrievals.

The trending engine 250 can receive one or more of the work-level metrics 204 generated by the metrics generator 230 for usage logs over a specified time period and generate one or more trends 208 that can be output by the traffic analyzer 160. As one non-limiting example, the trending engine 250 can receive a work-level usage indicator corresponding to a retrieval history of works (e.g., a number of times that the work was retrieved from a source database) over a specified period of time, and can compare the retrieval history of the works to the retrieval history of other works that are in the same or a similar field. Based on the comparison, the trending engine 250 can determine which of the works have been retrieved more often than their peers and can generate a trending works list, which can be rendered via one or more GUIs displayed by the display device of the user devices.

The recommendation engine 260 can receive one or more of the work-level metrics 204 generated by the metrics generator 230 and generate one or more recommendations 210 that can be output by the traffic analyzer 160. As one non-limiting example, the recommendation engine 260 can receive a work-level usage indicator corresponding to a retrieval history of works (e.g., a number of times that the work was retrieved from a source database) over a specified period of time, and can correlate the retrieval history of the works with the search terms used to return the search results that identified the works as well as the metadata associated with the works (e.g., bibliographic and citation information) to generate links and/or cross-references in the metadata database and/or the source database between works based on the correlation. When a user establishes a session and submits a search request, the instance of the user interface engine associated with the session can identify recommended works based on the search terms and the results returned in response to the search request. As another example, when a user initiates an action to retrieve a work identified in search results, the user interface engine can construct a database query to identify recommend works based on links or cross references in the metadata database between the retrieved work and recommended works.

The ranking engine 270 can receive one or more of the work-level metrics 204 generated by the metrics generator 230 and generate one or more rankings 212 that can be output by the traffic analyzer 160. As one non-limiting example, the ranking engine 270 can receive a work-level usage indicator corresponding to a retrieval history of works (e.g., a number of times that the work was retrieved from a source database) over a specified period of time, and can compare the retrieval history of the works to the retrieval history of other works that are in the same or a similar field. Based on the comparison, the ranking engine 250 can rank the works against their peers to assign the works a relative ranking within a specified field or topic.

Figure 3:
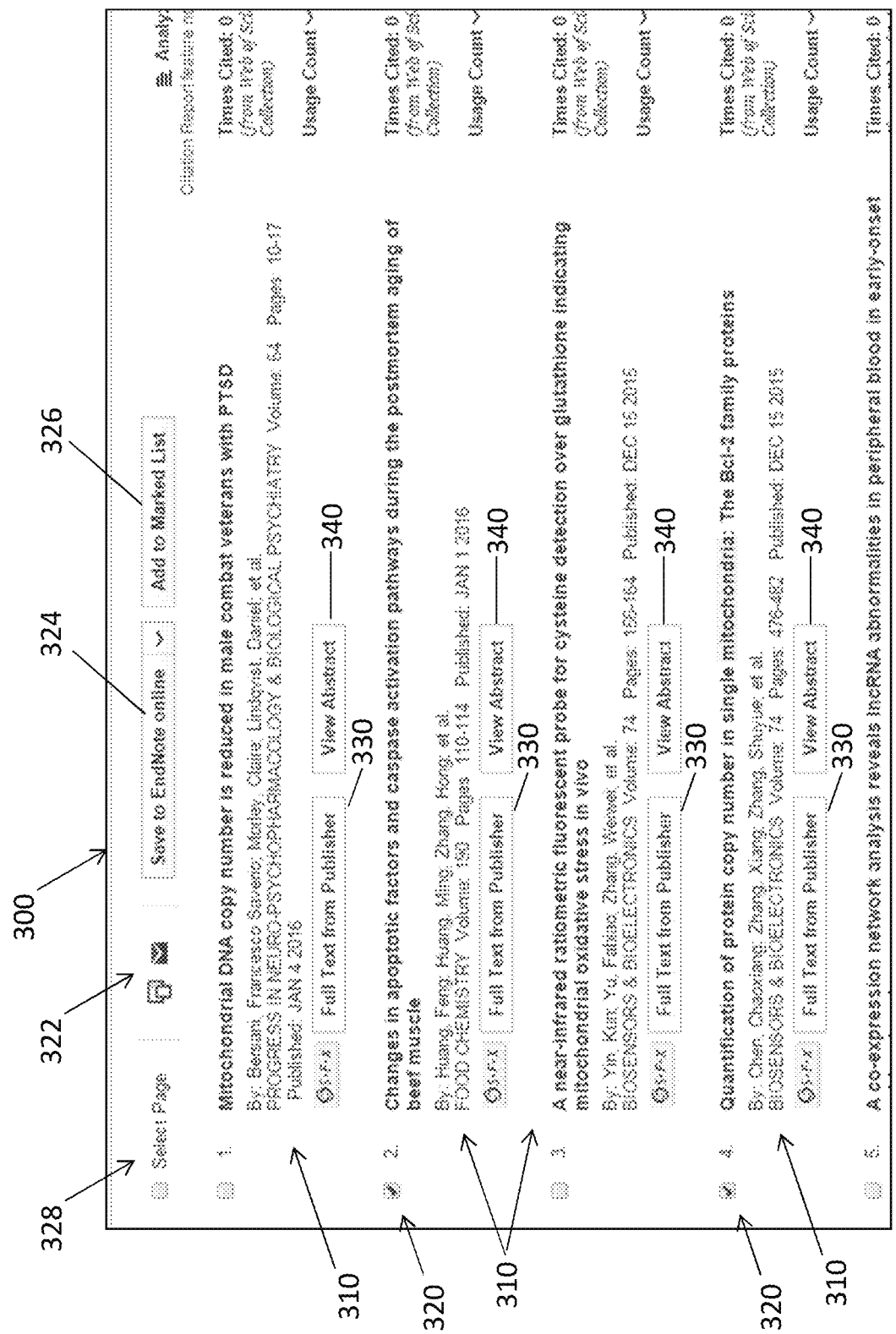
FIG. 3 depicts a graphical user interface including a list of results in response to a search query in accordance with exemplary embodiments of the present disclosure

FIG. 3 shows a graphical user interface (GUI) 300 that includes a summary of the results to a query in accordance with exemplary embodiments of the present disclosure. For example, the GUI 300 includes a list of works 310 that have been returned in response to a search of one or more source repositories. In exemplary embodiments, the list of works 310 presented by the GUI 300 can be subset of the results returned by embodiments of the information retrieval system 100 shown in FIG. 1 (e.g., ten, twenty-five, fifty, works from the results). The rendering of the list of works 310 in the GUI 300 can be registered in a usage log for the session as a summary event. If a user chooses to navigate to the next increment of results to receive a presentation of another list of works from the results, presentation of the next list of works in the results can be registered as another summary event in the usage log.

The list of works 310 can include the titles of the works as well as some other bibliographic information about the works. A user can interact with the GUI 300 to view and/or take one or more actions for one or more works include in the list of works 310. For example, the user can choose to take one or more actions with a subset of the works by individually selecting data entry fields (e.g., check boxes 320) next to each work, and then selecting one or more action buttons. For example, the user can select the check boxes 320 and then can select the action buttons 322 to cause the information retrieval system to trigger a print operation for the selected works and/or an e-mail operation for the selected works.

In response to receiving a selection of one or more of the action buttons 322, the information retrieval system can register one or more payoff events in the usage log for the session. The user may also select the action buttons 324 and 326 to perform one or more actions with respect to the selected works from the list of works 310. For example, selection of the action button 324 can result in the selected works being stored in an online account associated with the user identifier for the session (or can result in other actions being taken by the information retrieval system) and selection of the action button 326 can result in the selected works being added to a marked list by the information retrieval system. Selection of the action buttons 324 and 326 can cause the information retrieval system to register one or more payoff events in the usage log for the session. In exemplary embodiments, a data entry field (e.g., a check box 328) can be provided in the GUI 300 that allows for a bulk selection of all of the works included in the list of works 310 rendered in the GUI 300 (e.g., the list of ten, twenty five, fifty, etc. works forming a subset of the results rendered by the GUI 300). If the check box 326 is selected and one or more of the action buttons, 322, 324, and/326, the information retrieval system can register one or more payoff events in the usage log for the session.

The GUI 300 can provide separate action buttons 330 and 340 for each work in the list of works 310. As one example, the action button 330 can be provided to allow a user to navigate to a full text of the work to which the selected action button 330 corresponds. As another example, the action button 340 can be provided to allow a user to navigate to an abstract of the work to which the selected action button 340 corresponds. In response to the selection of the action buttons 330 and/or 340, the information retrieval system can register one or more payoff events in the usage log for the session.

FIG. 4A depicts a portion of an exemplary usage log 400 in accordance with exemplary embodiments of the present disclosure that corresponds to data traffic generated in response to human interaction. FIG. 4B depicts a portion of an exemplary usage log 450 in accordance with exemplary embodiments of the present disclosure that corresponds to data traffic generated a software robot. As shown in FIGS. 4A and 4B, the usage logs 400 and 450 can include log entries representing session events that occurred during a session corresponding to the usage log 400. The usage log can include times 402 at which the session events occurred during the session and can be associated with a session identifier, source identifier, and a user identifier. The usage log 400 can include queries 404 generated during the session, summary events 406 generated during the session, and payoff events 408 generated during the session.

The queries 404 can include search requests (and refinements) submitted to an exemplary embodiment of the information retrieval system. The summary events 406 can include list views of the search results or portions thereof and/or views of metadata and/or bibliographic information of a work (e.g., journal article). The payoff events 408 can in retrieval of full text versions of a work for viewing, printing, sharing, downloading, and the like. The summary and payoff events can be associated with one or more unique document identifiers 410 that corresponds to one or more works identified in the search results, and can be used by the information retrieval system to construct database queries that to retrieve the work from source database.

Figure 5:
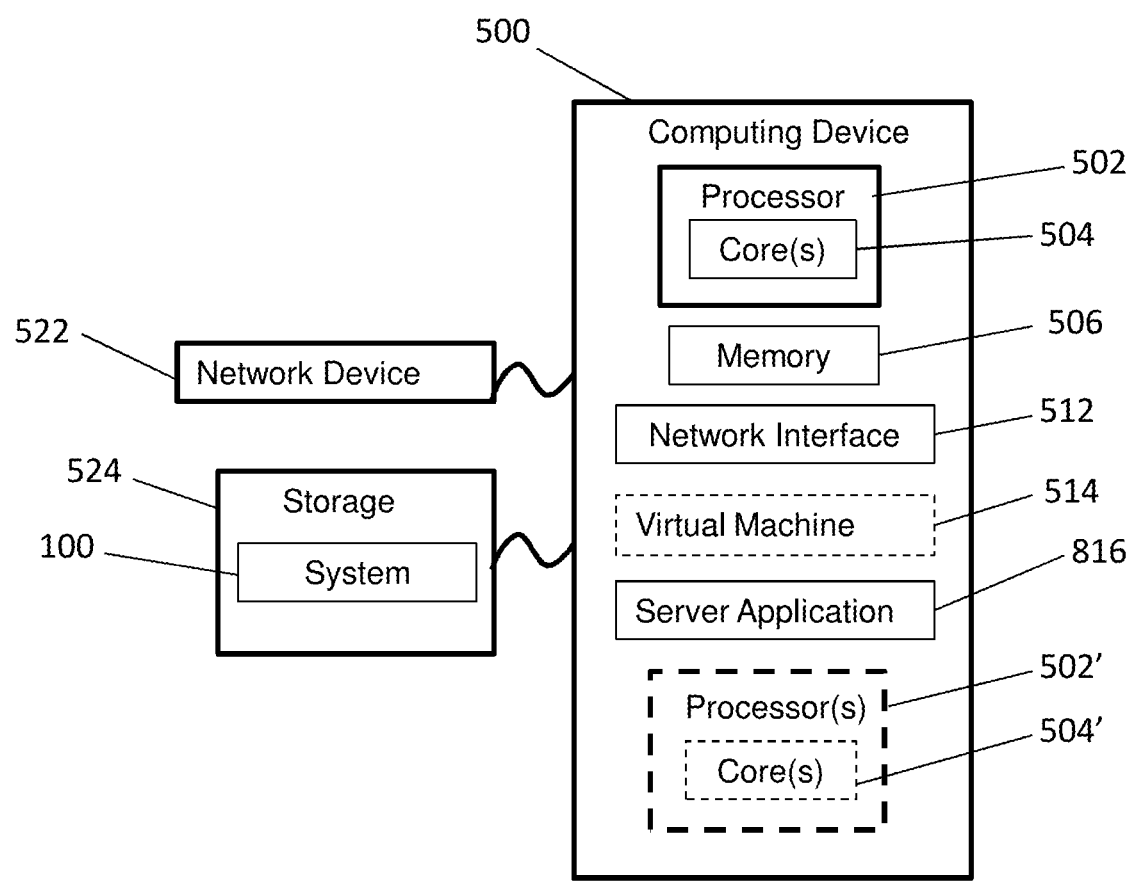
FIG. 5 depicts an exemplary server for implementing embodiments of the information retrieval system in accordance with exemplary embodiments of the present disclosure.

FIG. 5 depicts a block diagram of an exemplary computing device 500 that can be utilized to implement embodiments of the information retrieval system 100 or portions thereof. In the present embodiment, the computing device 500 is configured as a server that is programmed and/or configured to execute one of more of the operations and/or functions of the information retrieval system 100 and to facilitate communication with a user devices, such as embodiments of the user devices 104a-c. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the system 100 or portions thereof. The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

The computing device 500 may also include one or more storage devices 524, such as a hard-drive, CD-ROM, mass storage flash drive, or other computer readable media, for storing data and computer-readable instructions and/or software that can be executed by the processing device 502 to implement exemplary embodiments of the system 100 described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. While the computing device 500 depicted in FIG. 5 is implemented as a server, exemplary embodiments of the computing device 500 can be any computer system, such as a workstation, desktop computer or other form of computing or telecommunications device that is capable of communication with other devices either by wireless communication or wired communication and that has sufficient processor power and memory capacity to perform the operations described herein.

The computing device 500 may run any server application 516, such as any of the versions of server applications including any Unix-based server applications, Linux-based server application, any proprietary server applications, or any other server applications capable of running on the computing device 500 and performing the operations described herein. An example of a server application that can run on the computing device includes the Apache server application.

Figure 6:
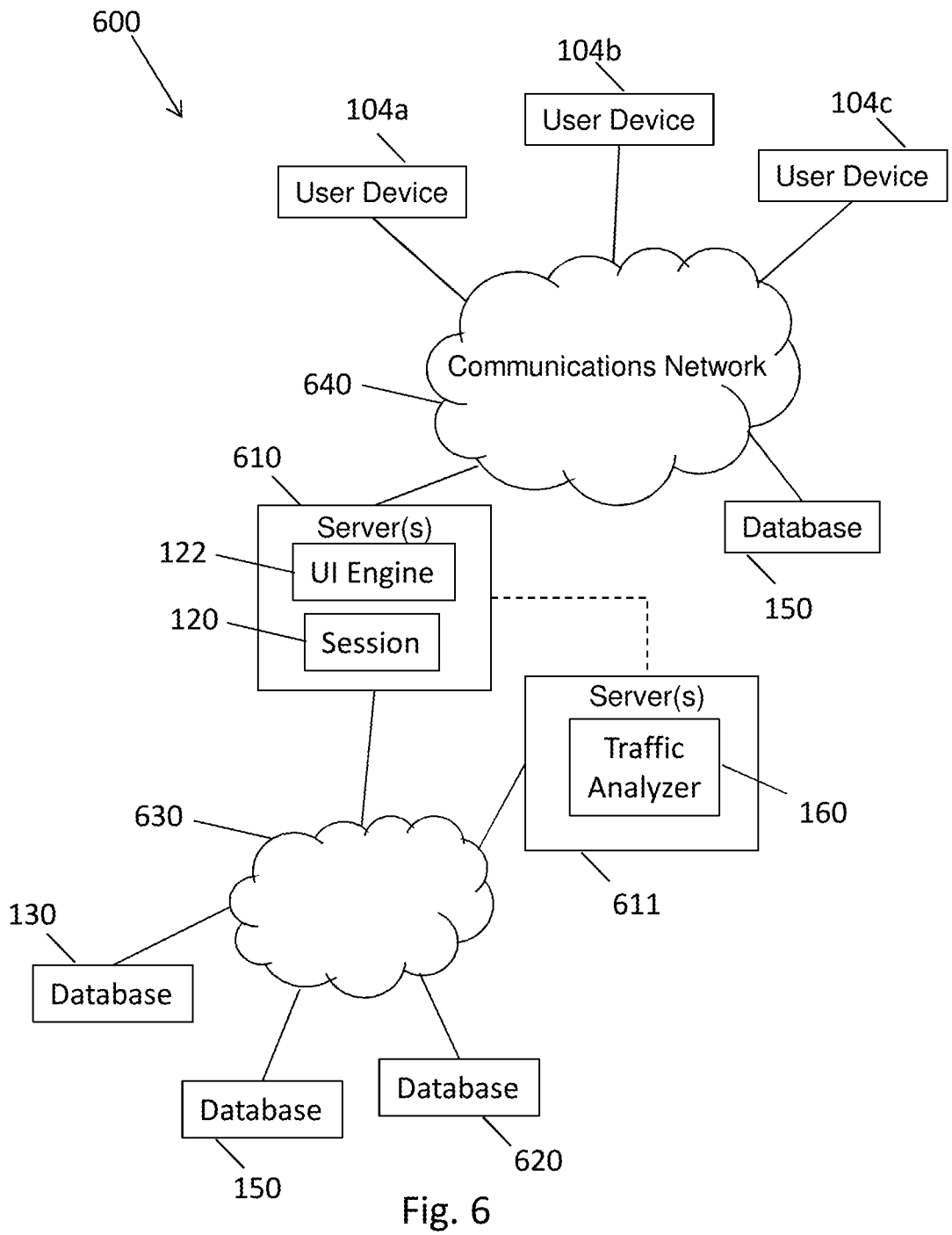
FIG. 6 depicts an exemplary distributed server environment for implementing embodiments of the information retrieval system in accordance with embodiments of the present disclosure.

FIG. 6 depicts an exemplary distributed server environment 600 for implementing embodiments of the information retrieval system 100 in accordance with embodiments of the present disclosure. As shown in FIG. 6, the environment 600 can be implemented using servers 610-611, metadata database 130, source database 150, and usage log database 620, which can be operatively coupled to each other through a communication network 630. The communication network can be implemented as an Intranet, virtual private network (VPN), wide area network (WAN), local area network (LAN), and/or other suitable communication network.

The server 610 can be programmed to execute instances of the user interface engine 122 to support session 120 and facilitate interaction between user device 104a-c and the information retrieval system 100. The user devices 104a-c can be operatively coupled to the sever 610 via a communication network 640, which can be the Internet, a wide area network (WAN), local area network (LAN), and/or other suitable communication network. The user devices 104a-c can initiate communication with the server 610 to establish the sessions 120 and can submit one or more search requests to the server 610. Upon receipt of a search request, the server 610 can construct one or more database queries using search terms included in the search request and can query the metadata database 130. The metadata database 130 can return metadata associated with works stored in the source databases 150, and the server 610 can execute an instance of the user interface engine 122 to provide instructions and the search results to the requesting user device (e.g., user device 104a). The instructions can be used by the user device 104a to render the search results via one or more GUIs 108.

In exemplary embodiments, the search results can identify one or more works that can be retrieved from the source databases 150 by their unique identifiers, title, publisher, author(s), and/or any other metadata that can be associated with the works. In addition, the search results can include one or links associated with the works, which can be selected on the user device 104a to facilitate one or more actions with respect to the works corresponding to the links. For example, a user can interact with the results to select a link to retrieve a work corresponding to the selected link, and the user device 104a can transmit a retrieval request to the server 610, which can process the request to construct a query including for example, a unique identifier corresponding to the work, which can be used to retrieve the work from the source database 150 within the information retrieval system 100 or the source database 150 disposed external to the information retrieval system 100 (e.g., operatively coupled to the communications network 640). Upon retrieval of the work, the server 610, can transmit the work to the user device to allow the user to view the work.

While the user devices and the server 610 are interacting the instances of the user interface engines 122 are creating and maintaining usage logs for each active session and are storing the usage logs in the database 620 for future use. For example, each time the user devices submit a search request or a refined search request, the user interface engine 122 can be executed by the server 610 to add an entry to the usage logs, and each time the server 610 a user device requests the server to take one or more actions with respect to works stored in the source databases 150 (e.g., requests to retrieve the works), the server can execute the user interface engine 122 to add an entry to the usage log.

The server 611 can be configured to execute the traffic analyzer 160 to analyze the usage logs stored in the database 620. For example, the traffic analyzer 160 can retrieve one or more usage/session logs from the database 620, and can detect whether the usage logs and/or the queries within the usage logs are associated with human behavior or automated software robot behavior based on the log entries included in the usage log. After detecting and cleansing the usage logs of robotic traffic, the traffic analyzer 160 can generate one or more work-level usage metrics, forecasts, trends, recommendation, and/or rankings, which can be selective transmitted to the server 610 and output to the user devices 104*a-c* by the server 610 in response to interactions between the user devices 104*a-c* and the server 611. In some embodiments, the traffic analyzer can generate one or more reports that include the one or more work-level usage metrics, forecasts, trends, recommendation, and/or rankings, which may be used by publishers, funders, researchers, and the like to determine a value of a body of works or specific fields or topics.

Figure 7:
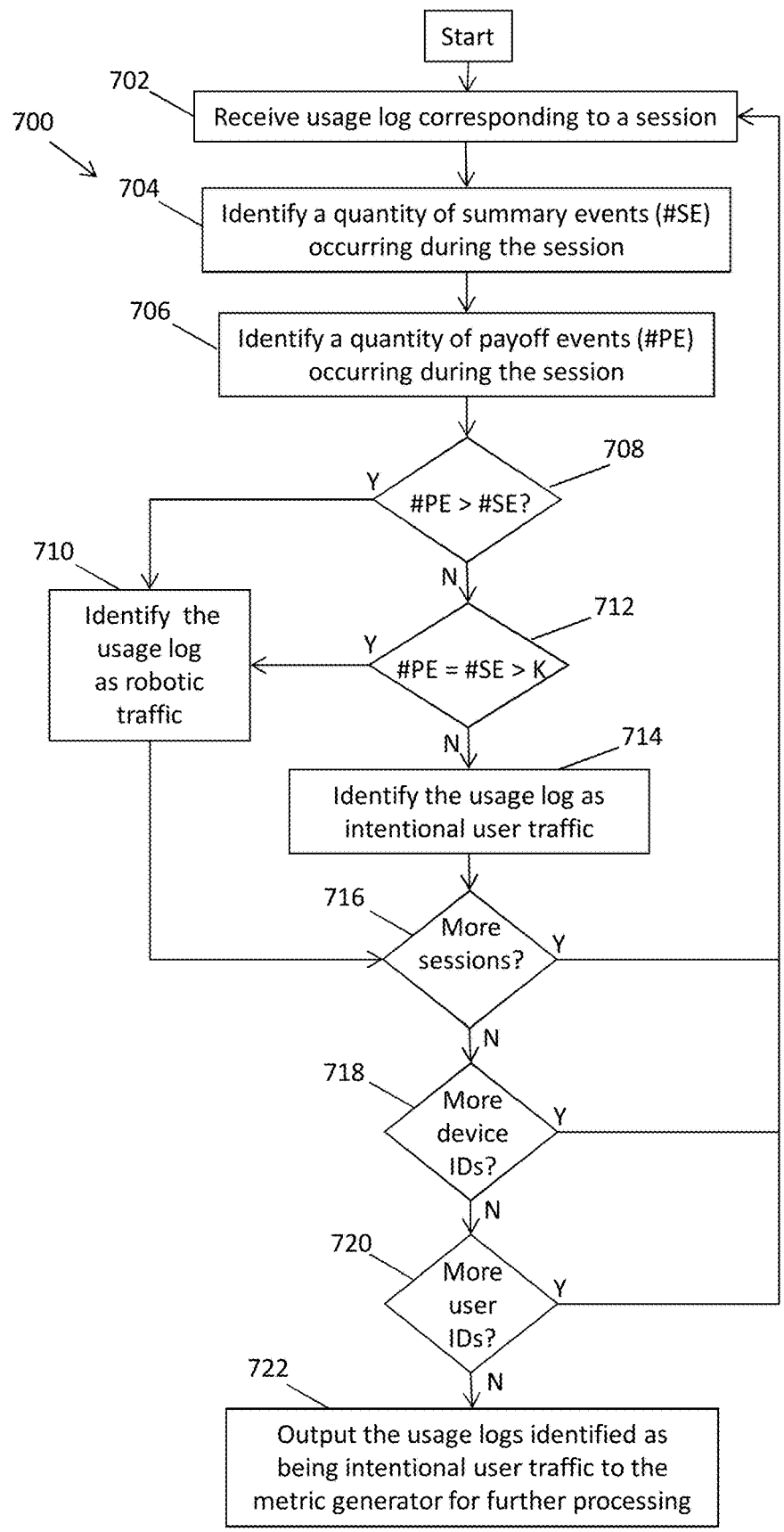
FIG. 7 is a flowchart of an exemplary quantity-based detection process for detecting robotic traffic based on events captured in usage logs associated with sessions.

FIG. 7 is a flowchart of an exemplary time-invariant quantity-based robotic traffic detection process 700 for detecting robotic traffic at a session level based on session events captured in usage logs associated with sessions. Exemplary embodiments of the process 700 can be performed for each usage log, for each source identifier, for each session identifier, and/or for each query included in each usage log. As one example, the process 700 can identify a user identifier having one or more source identifiers (e.g., IP or MAC addresses) associated with the user identifier, where each of the one or more source identifiers can have one or more session identifiers associated therewith. The one or more session identifiers can correspond to usage logs and the traffic detector can process the session events in each of the usage logs for each of the source identifiers associated with the user identifier to detect robotic traffic in each of the usage logs. The process 700 can be repeated for each user identifier, for example, until the usage logs associated with each of the user identifiers have been processed for robotic traffic detection. In some embodiments, the process 700 can be performed sequentially for each usage log for each source identifier, for each user identifier. In some embodiments, the process 700 can be performed in parallel such that multiple usage logs for one or more source identifiers, for one or more user identifiers can be processed substantially simultaneously.

With respect to the example process 700 shown in FIG. 7, at step 702, the robot detector of the traffic analyzer retrieves session events in a usage log (having a session identifier) associated with a user identifier and a source identifier. At step 704, the robot detector determines a quantity of summary events that occurred during the session represented by the retrieved usage log based on entries in the usage log, and at step 706, the robot detector determines a quantity of payoff events that occurred during the session represented by the retrieved usage log based on entries in the usage log. At step 708, the robot detector determines whether the quantity of payoff events for the session is greater than the quantity of summary events for the session. If the quantity of payoff events for the session is greater than the quantity of summary events for the session, at step 710, the robot detector determines that the session events associated with the usage log were generated based on robot traffic. If the quantity of payoff events for the session is not greater than the quantity of summary events for the session, at step 712, the robot detector determines whether the quantity of summary event is equal to the quantity of payoff events and whether the equal quantities are greater than a threshold value (K). The threshold value (K) can be determined based on statistics analysis of training data which can include usage logs for a given time period, e.g., a twenty-four hour time period. As one example, the threshold value can be a ratio between different session event types occurring during sessions, such as a ratio between summary and payoff events. The training data can be updated as new usage logs are generated and as such the threshold value (K) may be generated dynamically as the training data changes. If the quantity of summary event is equal to the quantity of payoff events and whether the equal quantities are greater than a threshold value, the process proceeds at step 710. If the quantity of payoff events in the usage log is not equal to or less than the quantity of summary events or are equal but the equal quantities are less than the threshold value, the robot detector determines, at step 714, that the traffic represented by the session events was generated based on traffic resulting from human interactions with the information retrieval system, e.g., via the GUIs.

At step 716, the robot detector determines whether there are more usage logs associated with the source identifier for the user identifier. If there are more usage logs associated with the source identifier for the user identifier, the process 700 repeats at step 702 for the next usage log. If there are no more usage logs associated with the source identifier for the user identifier, at step 718, the robot detector determines whether there are other source identifiers associated with the user identifier having usage logs to be evaluated. If there are other source identifiers associated with the user identifier having usage logs to be evaluated, the process repeats at step 702 for a usage log associated with the next source identifier associated with the user identifier. If there are no other source identifiers associated with the user identifier having usage logs to be evaluated, at step 720, the robot detector determines whether there are more user identifiers having usage logs to be evaluated. If there are more user identifiers having usage logs to be evaluated, the process repeats at step 702 for a usage log associated with a source identifier for the next user identifier. If there are no more user identifiers having usage logs to be evaluated, at step 722, the traffic analyzer cleanses the usage logs of the usage logs corresponding to robot traffic and outputs the usage logs that are identified as being associated with traffic generated in response to human user interaction with the information retrieval system, e.g., via the graphical user interfaces.

Figure 8:
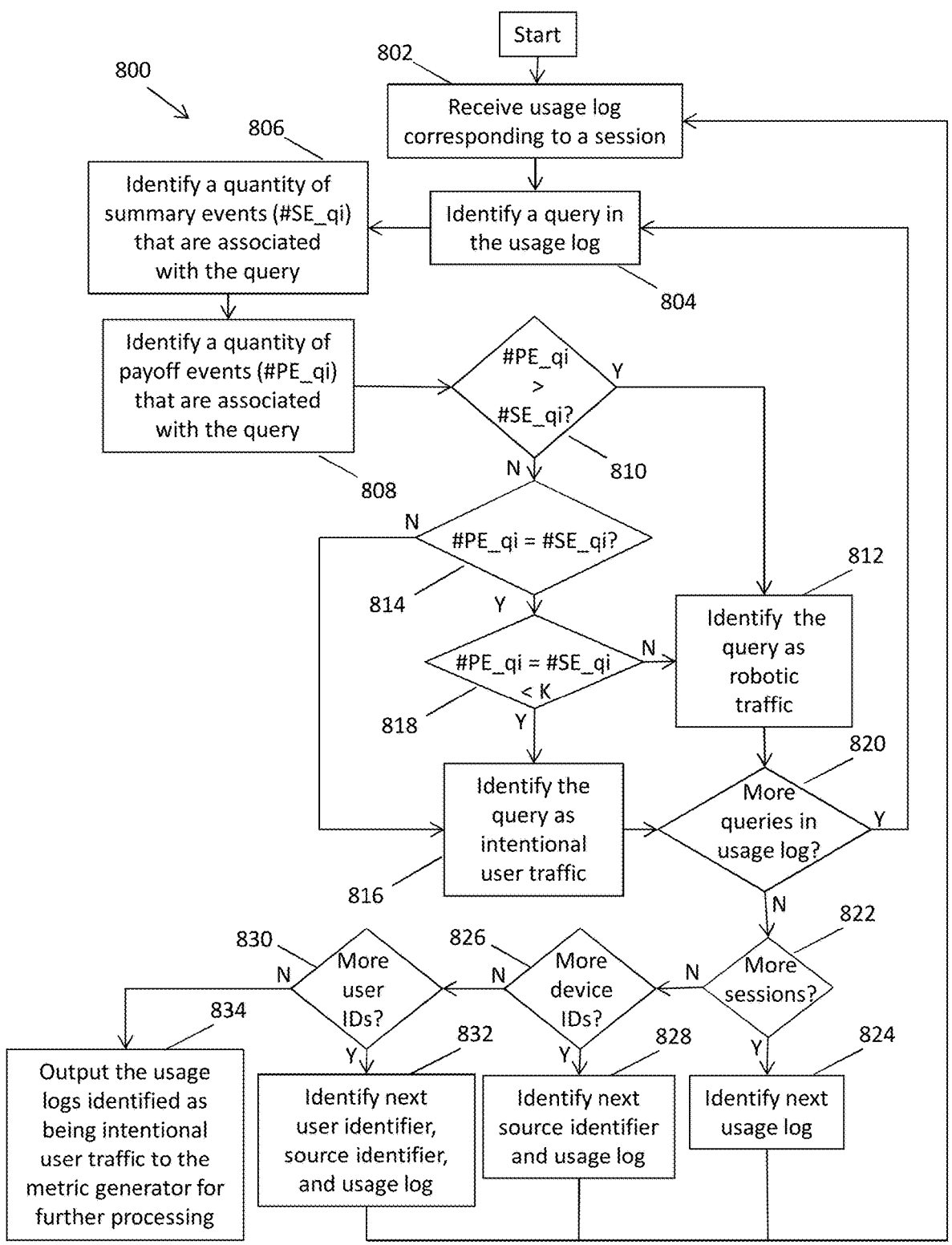
FIG. 8 is a flowchart of an exemplary quantity-based detection process for detecting robotic traffic at the query-level based on events captured in usage logs associated with sessions including at least one query.

FIG. 8 is a flowchart of an exemplary time-invariant quantity-based robotic traffic detection process 800 for detecting robotic traffic at the query-level based on session events captured in usage logs associated with sessions including at least one query. Exemplary embodiments of the process 800 can be performed for each query in each usage log (associated with a session identifier), for each source identifier, and for each user identifier. As one example, the process 800 can identify a user identifier having one or more source identifiers (IP or MAC addresses) associated with the user identifier, where each of the one or more source identifiers can have one or more session identifiers associated therewith. The one or more session identifiers can correspond to usage logs and the traffic detector can process each query of each of the usage logs for each of the source identifiers associated with the user identifier to detect robotic traffic in each of the usage logs. The process 800 can be repeated for each user identifier, for example, until the usage logs associated with each of the user identifiers have been processed for robotic traffic detection. In some embodiments, the process 800 can be performed sequentially for each usage log for each source identifier, for each user identifier as described herein. In some embodiments, the process 800 can be performed in parallel such that multiple usage logs for one or more source identifiers, for one or more user identifiers can be processed substantially simultaneously as described herein.

With respect to the example process 800 shown in FIG. 8, at step 802, the robot detector retrieves session events in a usage log (having a session identifier) associated with a user identifier and a source identifier. At step 804, the robot detector identifies a query in the usage log. At step 806, the robot detector determines a quantity of summary events that are associated with the query based on entries in the usage log, and at step 808, the robot detector determines a quantity of payoff events that are associated with the query based on entries in the usage log. At step 810, the robot detector determines whether the quantity of payoff events associated with the query is greater than to the quantity of summary events associated with the query. If the quantity of payoff events associated with the query is greater than to the quantity of summary events associated with the query, at step 812, the robot detector determines that the traffic represented by the session events associated with the query was generated based on robot traffic. If the quantity of payoff events is not greater than the quantity of summary events (i.e., the quantity of summary event is equal to or greater than the quantity of payoff events), at step 814, the robot detector determines whether the quantity of summary event is equal to the quantity of payoff events for the query. If the quantities of summary and payoff events are not equal (i.e., the quantity of summary events is greater than the quantity of payoff events), at step 816, the robot detector determines that the usage log was generated based on traffic resulting from human interactions with the information retrieval system, e.g., via the GUIs. If the quantity of summary events is equal to the quantity of payoff events, at step 818, the robot detect determines whether the equal quantities are less than a threshold value (K). If the equal quantities are not less than a threshold value (K), the process proceeds at step 812. The threshold value (K) can be determined based on statistics analysis of training data which can include usage logs for a given time period, e.g., a twenty-four hour time period. As one example, the threshold value can be a function of a ratio between different event types occurring in usage logs such as a function of a ratio between summary and payoff events. The training data can be updated as new usage logs are generated and as such the threshold value (K) may be generated dynamically as the training data changes. If the equal quantities are less than the threshold value, the robot detector determines, at step 816, that the traffic represented by the session events was generated based on traffic resulting from human interactions with the information retrieval system, e.g., via the GUIs.

At step 820, the robot detector determines whether there are more queries in the usage log. If there are more queries in the usage log, the process 800 repeats at step 804 for the next query. If there are no more queries in the usage log, at step 822, the robot detector determines whether there are other usage logs associated with the source identifier. If there are other usage logs associated with the source identifier, the robot detector identifies a usage log from the source identifier at step 824 and repeats at step 802 for the next usage log. If there are no other usage logs associated with the source identifier, at step 826, the robot detector determines whether there are other source identifiers associated with the user identifier having usage logs to be evaluated. If there are other source identifiers associated with the user identifier having usage logs to be evaluated, the robot detector identifies the next source identifier at step 828 and a usage log for the next identifier at step 824, and the process repeats at step 802. If there are no other source identifiers associated with the user identifier having usage logs to be evaluated, at step 830, the robot detector determines whether there are more user identifiers having usage logs to be evaluated. If there are more user identifiers having usage logs to be evaluated, the robot detector identifies the next user identifier at step 832, the next source identifier associated with the next user identifier at step 828, and a usage log for the next identifier at step 824, and the process repeats at step 802. If there are no more user identifiers having usage logs to be evaluated, at step 834, the traffic analyzer cleanses the session events in the usage logs corresponding to robot traffic and outputs the session events that are identified as being associated with traffic generated in response to human user interaction with the information retrieval system, e.g., via the graphical user interfaces.

Figure 9:
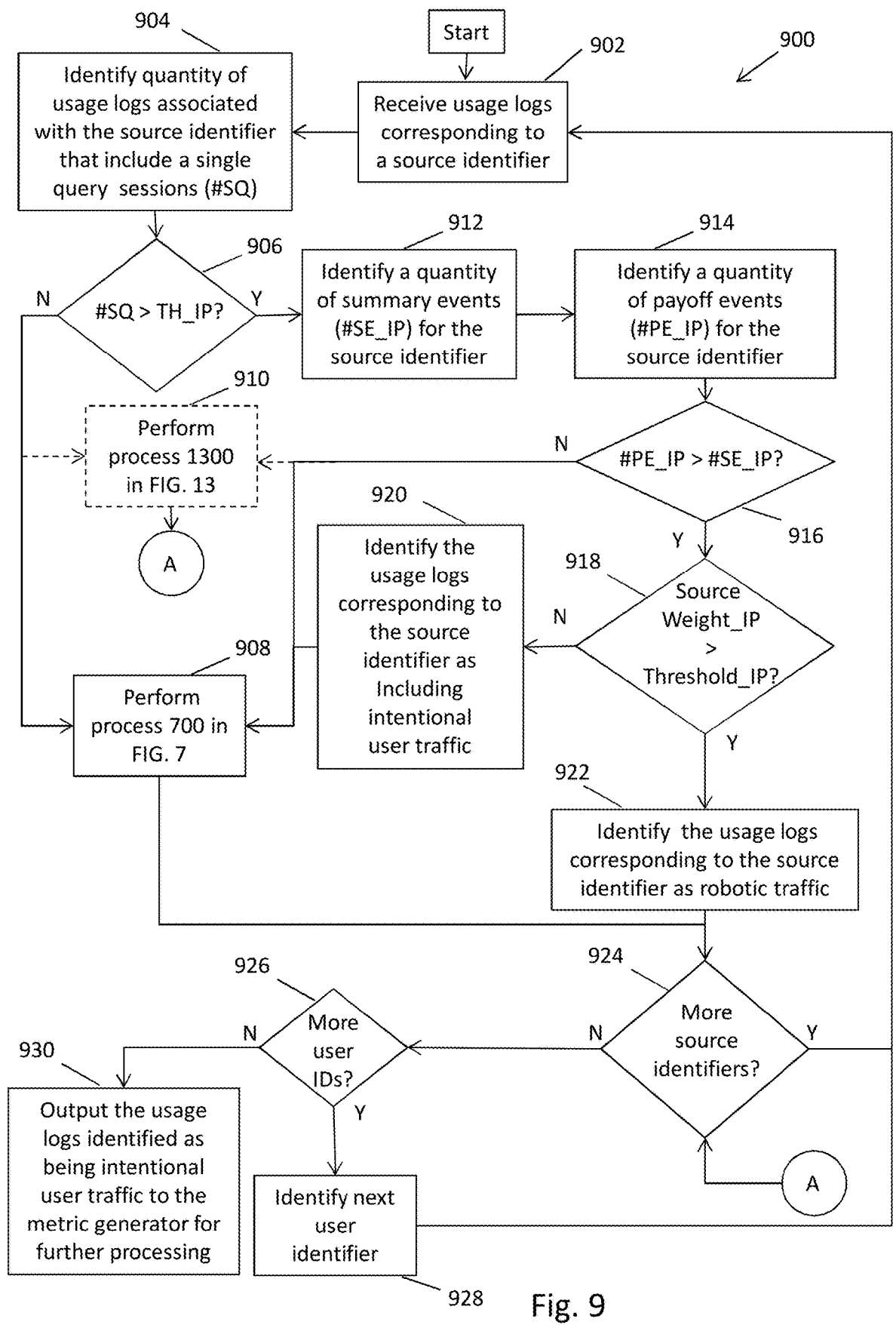
FIG. 9 is a flowchart of an exemplary quantity-based detection process for detecting robotic traffic at the source-level based on events captured in usage logs associated with source identifiers.

FIG. 9 is a flowchart of an exemplary time-invariant quantity-based robotic traffic detection process 900 for detecting robotic traffic at the source-level based on events captured in usage logs associated with source identifiers (e.g., IP or MAC address). Exemplary embodiments of the process 900 can be performed for each source identifier for each user identifier. As one example, the process 900 can identify a user identifier having one or more source identifiers (e.g., IP or MAC addresses) associated with the user identifier, where each of the one or more source identifiers can have one or more session identifiers associated therewith. The one or more session identifiers can correspond to sessions represented by usage logs and the traffic detector can process the usage logs for each source identifier associated with the user identifier to detect robotic traffic from each of the source identifiers (e.g., IP or MAC addresses). The process 900 can be repeated for each user identifier, for example, until the source identifiers associated with each of the user identifiers have been processed for robotic traffic detection. In some embodiments, the process 900 can be performed sequentially for each source identifier for each user identifier as described herein. In some embodiments, the process 900 can be performed in parallel such that queries and/or usage logs from multiple source identifiers, for one or more user identifiers, can be processed substantially simultaneously as described herein.

With respect to the example process 900 shown in FIG. 9, at step 902, the robot detector retrieves session events in usage logs (having session identifiers) associated with a source identifier (e.g., an IP or MAC address) of a user identifier. At step 904, the robot detector identifies a quantity of sessions having usage logs with a single query (#SQ). At step 906, the robot detector determines whether the quantity of sessions having usage logs with a single query for the source identifier exceeds a threshold value. The threshold value can be dynamically determined based on statistics analysis of training data which can include usage logs for a given time period, e.g., a twenty-four hour time period. As one example, the threshold value can be an average or median of single-query usage logs in the training data and/or a ratio between single query usage logs and multi-query usage logs. As another example, the threshold value can derived from one or more probabilities and/or standard deviations of the data included in the training data. The training data can be updated as new usage logs are generated and as such the threshold value may be generated dynamically (periodically or continuously) as the training data changes. If the quantity of sessions represented by the usage logs having a single query for the source identifier does not exceed the threshold value, the process 900 proceeds to step 908 at which the robot detector performs the process 700 shown in FIG. 7 and/or proceeds to step 910 at which the robot detector performs the process 1300 shown in FIG. 13. If the quantity of sessions represented by usage logs having a single query for the source identifier does exceed the threshold value, the process 900 proceeds to steps 912 and 914.

At step 912, the robot detector identifies a quantity of summary events (#SE_IP) for the source identifier across multiple sessions, and at step 914, the robot detector identifies a quantity of payoff events (#PE_IP) for the source identifier across multiple sessions. At step 916, the robot detector determines whether the quantity of payoff events (#PE_IP) for the source identifier exceeds the quantity of summary events (#SE_IP) for the source identifier. If the quantity of payoff events (#PE_IP) for the source identifier does not exceed the quantity of summary events (#SE_IP) for the source identifier, the process 900 proceeds to step 908 at which the robot detector performs the process 700 shown in FIG. 7 and/or proceeds to step 910 at which the robot detector performs the process 1300 shown in FIG. 13. If the quantity of payoff events (#PE_IP) for the source identifier does exceed the quantity of summary events (#SE_IP) for the source identifier, the process 900 proceeds to step 918 at which the robot detector determines whether a source identifier weight exceeds a threshold weight value. If the source identifier weight does not exceed a threshold weight value, at step 920, the robot detector identifies the usage logs corresponding to the source identifier as including intentional human behavior and proceeds to step 908 at which the robot detector performs the process 700 shown in FIG. 7. Otherwise, at step 922, the robot detector identifies the usage logs corresponding to the source identifier as robotic traffic. The source identifier weight can be determined based on a one or more statistics determined based on a set of traffic data for a given time period. For example, the statistics can be based on hourly, daily, weekly, monthly, yearly, and the like, traffic data for the source identifier. As a non-limiting example, the source identifier weight can be based on a function of a quantity of payoff events for the source identifier over a time period of twenty-four hours, a quantity of summary events for the source identifier over the time period, a quantity of single query sessions for the source identifier over the time period, and/or a total quantity of queries from the source identifier. As another example, the threshold weight value can be derived from a probability that a source weight for a source identifier will be less than the threshold weight value over a specified period of time. As another example, the threshold weight value can be expressed for a source identifier as follows:

$$w(IP)=[\#Payoffs\ (IP)-\#Summaries\ (IP)]*(\#single\_queries(IP)/\#total\_queries(IP))$$

where $w(IP)$ denotes the threshold weight value, #Payoffs (IP) denotes the quantity of payoff events for source identifiers, #Summaries (IP) denotes the quantity of summary events for the source identifiers, #single_queries(IP) denotes the quantity of single query sessions for the source identifiers, and #total_queries(IP) denotes the total quantity of queries for the source identifiers.

From steps 908, 910 and 922, the process 900 proceeds to step 924, at which the robot detector determines whether there are more source identifiers (e.g., IP or MAC addresses) associated with the user identifier. If there are more source identifiers associated with the user identifier, the process 900 repeats from step 902 for the next source identifier associated with the user identifier. If there are no more source identifiers associated with the user identifier, the process 900 proceeds to step 926 to determine whether there are more user identifiers to be processed. If there are more user identifiers to be processed, at step 928, the robot detector identifies the next user identifier and the process 900 repeats from step 902 for a source identifier associated with the next user identifier. If there are no more user identifiers to be processed, at step 930, the robot detector outputs source identifiers and/or their associated usage logs that have been identified as being related to intention user traffic to the metric generator for further processing.

Figure 10:
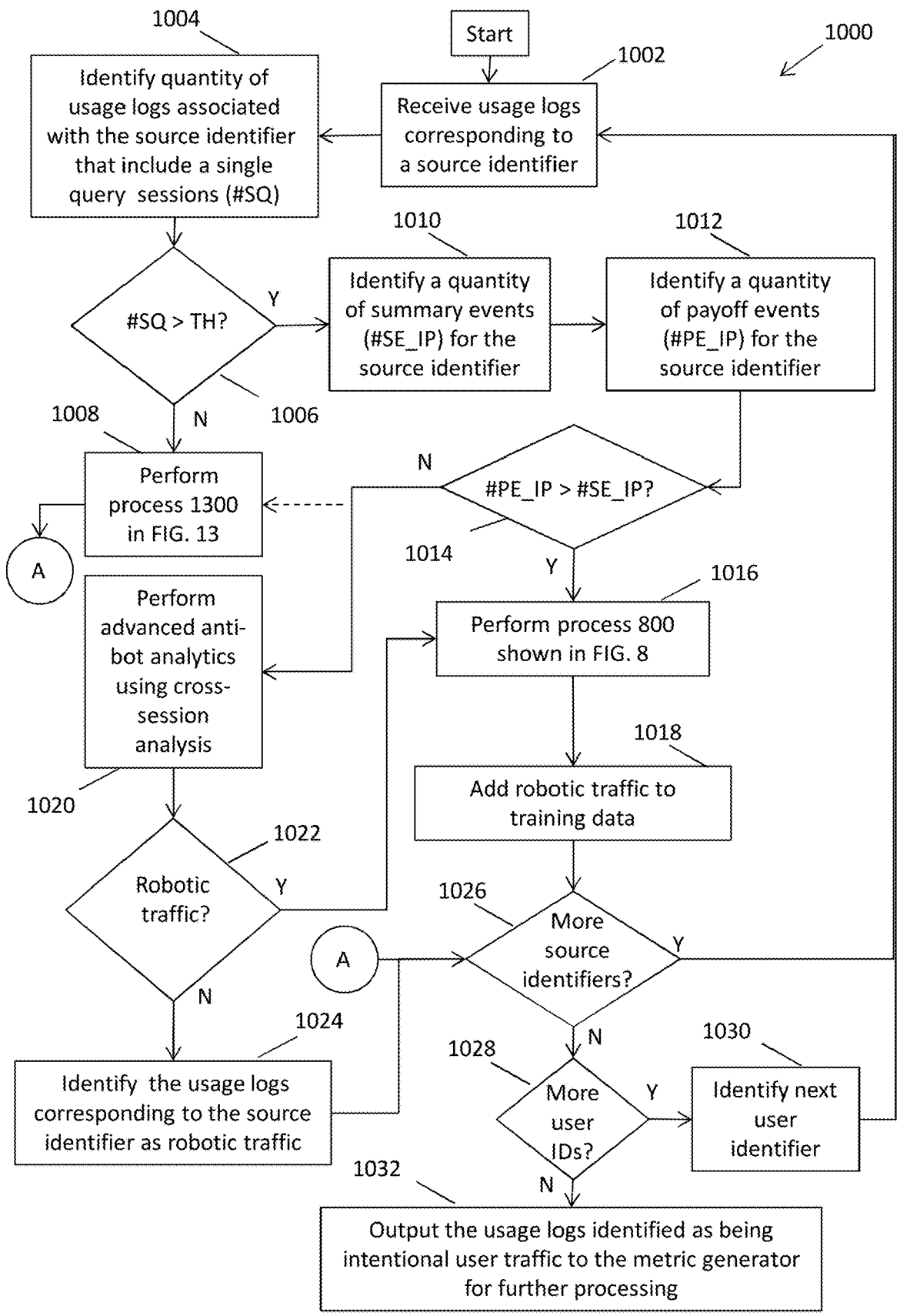
FIG. 10 is a flowchart of another exemplary quantity-based detection process for detecting robotic traffic at the source-level based on events captured in usage logs associated with source identifiers.

FIG. 10 is a flowchart of another exemplary time-invariant quantity-based robotic traffic detection process 1000 for detecting robotic traffic at the source-level (e.g., IP or MAC address level) based on events captured in usage logs associated with source identifiers (e.g., IP or MAC addresses). Exemplary embodiments of the process 1000 can be performed for each source identifier for each user identifier. As one example, the process 1000 can identify a user identifier having one or more source identifier associated with the user identifier, where each of the one or more source identifier can have one or more session identifiers associated therewith. The one or more session identifiers can correspond to one or more sessions represented by usage logs and the robot detector can process each source identifier associated with the user identifier to detect robotic traffic in each of the source identifiers using cross-session analysis, machine learning, and/or pattern analysis. The process 1000 can be repeated for each user identifier, for example, until the source identifier associated with each of the user identifiers have been processed for robotic traffic detection. In some embodiments, the process 1000 can be performed sequentially for each source identifier for each user identifier as described herein. In some embodiments, the process 1000 can be performed in parallel such that queries and/or usage logs for multiple source identifiers, for one or more user identifiers, can be processed substantially simultaneously as described herein.

With respect to the example process 1000 shown in FIG. 10, at step 1002, the robot detector retrieves session events in usage logs (having a session identifiers) associated with a source identifier of a user identifier. At step 1004, the robot detector identifies a quantity of sessions having usage logs with a single query (#SQ). At step 1006, the robot detector determines whether the quantity of sessions having usage logs with a single query for the source identifier exceeds a threshold value. If the quantity of sessions having usage logs with a single query for the source identifier does not exceed a threshold value, the process 1000 proceeds to step 1008 at which the robot detector performs the process 1300 shown in FIG. 13. If the quantity of sessions having usage logs with a single query for the source identifier does exceed the threshold value, the process 1000 proceeds to steps 1010 and 1012. At step 1010, the robot detector identifies a quantity of summary events (#SE_IP) for the source identifier across the sessions associated with the source identifier, and at step 1012, the robot detector identifies a quantity of payoff events (#PE_IP) for the source identifier across the sessions associated with the source identifier.

At step 1014, the robot detector determines whether the quantity of payoff events (#PE_IP) for the source identifier exceeds the quantity of summary events (#SE_IP) for the source identifier. If the quantity of payoff events (#PE_IP) for the source identifier exceeds the quantity of summary events (#SE_IP) for the source identifier, at step 1016, the robot detector performs the process 800 shown in FIG. 8, and at step 1018, adds robotic traffic included in the usage logs to set of training data. The training data can form a set of data that can be used to dynamically train the robot detector to detect robotic traffic. If the quantity of payoff events (#PE_IP) for the source identifier does not exceed the quantity of summary events (#SE_IP) for the source identifier, at step 1020, the robot detector performs advanced anti-bot analysis, and at step 1022 determines whether the usage logs corresponding to the source identifier are robotic traffic. If the usage logs corresponding to the source identifier are robotic traffic, the process 1000 proceeds to step 1016. If the usage logs corresponding to the source identifier are not identified as robotic traffic, at step 1024, the robot detector identifies the usage logs of the source identifier as being related to intentional human behavior.

From steps 1018 and 1024, the process 1000 proceeds to step 1026, at which the robot detector determines whether there are more source identifiers associated with the user identifier. If there are more source identifiers associated with the user identifier, the process 1000 repeats from step 1002 for the next source identifier associated with the user identifier. If there are no more source identifiers associated with the user identifier, the process 1000 proceeds to step 1028 to determine whether there are more user identifiers to be processed. If there are more user identifiers to be processed, at step 1030, the robot detector identifies the next user identifier and the process 1000 repeats from step 1002 for a source identifier associated with the next user identifier. If there are no more user identifiers to be processed, at step 1032, the robot detector outputs source identifiers and/or their associated usage logs that have been identified as being related to intention user traffic to the metric generator for further processing.

The advanced anti-bot analysis performed by the robot detector at step 1020 can include cross-session analysis of queries and/or usage logs, query keyword and structure analysis, one or more machine learning algorithms and/or pattern analysis. The cross sessions analysis can evaluate one or more traffic data from multiple session identifiers, e.g., multiple session identifiers associated with a source identifier and/or multiple session identifiers associated with multiple source identifiers for a user identifier. The query keyword and structure analysis can evaluate queries received during one or more sessions to determine whether the keywords and structures are likely formed by robot or by a human. For example, based on the training data associated with robotic traffic, the robot detector can learn which keywords and/or query structures are likely associated with robotic traffic. The machine learning algorithms can be trained using the training data to identify and detect robotic traffic. The pattern analysis can be trained to recognize one or more patterns in a usage log based on the training data. For example, the training can include robotic traffic and one or more patterns of robotic traffic can be extracted from the training data. When the robot detector recognizes one of the patterns in a query and/or usage log, the robot detector can associate the query and/or usage log with robotic traffic based on the recognition.

As a non-limiting example of advanced anti-bot analysis using cross-session analysis, a user can establish a session, generate a query, receive results, and close the session, which results in a single-query session. This user can repeat the same procedure from using the same user identifier and source identifier. Furthermore, a user can open session(s) under the same user identifier and source identifier without closing one or more the previously established session. Each session taken alone may appear to have been generated by traffic generated in response to human interaction. However, using cross-session analysis, exemplary embodiments of the traffic detector can detect that one or more of these sessions are associated with robotic traffic based on, for example, the structure of the queries and/or keywords included in the queries associated with the sessions for the user identifier and source identifier(s).

Using cross session analysis (e.g., at step 1020), the robot detector can separate and analyze single and multiple sessions at the source level (e.g., the IP or MAC address associated with the sessions). The following notation can be used to describe components of single-query sessions, multi-query sessions, and cross-session models, where Sid denotes the session identifier, S(k) denotes a quantity k summary events resulting from a query Q, and P(n) denotes a quantity n payoff events resulting for a query Q. As one example, a single-query session model can be modeled as follows:

$$Sid[Q\ S(k)P(n)]$$

A multi-query session can be modeled as follows:

$$Sid[Q_1S(k_1)(P(n_1), \ldots\ ],[Q_2S(k_2)(P(n_2), \ldots\ ]\ \ldots$$
$$[\ldots]$$

A cross-session model for sessions associated with a source identifier can be represented as follow:

$$Sid^{(1)}[Q_1^{(1)}S(k_1^{(1)})(P(n_1^{(1)})],[Q_2^{(1)}S(k_2^{(1)})(P(n_2^{(1)}), \ldots\ ],[\ldots]$$

$$Sid^{(2)}[Q_1^{(2)}S(k_1^{(2)})(P(n_1^{(2)})],[Q_2^{(2)}S(k_2^{(2)})(P(n_2^{(2)}), \ldots\ ],[\ldots]$$

As described herein, when the quantity of payoff events exceeds a quantity of summary events, the robot detector can identify the associated data traffic to be robotic traffic B, and when the quantity of payoff events is less than the quantity of summary events, the robot detector can identify the associated data traffic to be related to traffic generated based on human interaction, which can be denoted by an H. When the quantity of payoff events equals the quantity of summary events, the robot detector may not be able to identify the data traffic as either robotic or human and may perform further analysis. Instances where the quantity k of payoff events equals the k quantity of summary events can be referred to exception events and can be denoted by A(k). The cross session analysis performed by the robot detector (e.g., at step 1020) can utilize statistical analysis of session events at the source identifier level over a period of time (e.g., a fixed period of time) to perform further analysis of A(k) events (e.g., instances where the quantity of summary events equals the quantity of payoff events). As a non-limiting example, the robot detector can build a probability distribution for A(k) events occurring for a given source identifier over the period of time, where a normalized probability Prob(A(k)) can be determined by dividing the quantity of A(k) events by the total quantity of query events for a given source identifier (e.g., IP or MAC address) over the period of time. At the same time, it is reasonable to expect that the longer list of documents k in A(k), the more likely that A(k) corresponds to a bulk download without showing an interest in a particular document in this list. To take this observation into account, additional constrains can be applied (e.g., an exponential decay) on Prob(A(k)) to ensure that modified probability Prob'(A(k)) is a monotonically decreasing function of k.

Continuing the example, the modified probability Prob'(A(k)) can be compared to a minimum acceptable probability that the data traffic is the result of human interaction, which can be denoted as p_h. Then the threshold K (e.g., as described herein in FIGS. 7, 8, and 12) may be determined based on the condition that Prob'(A(K)) is equal to the minimum acceptable probability p_h. As another example, a session can include a query $Q^{(1)}$ that results in an equal number $k^{(1)}$ of summary and payoff events (i.e. a first $A(k^{(1)})$ event) and a next session which includes a query $Q^{(2)}$ that results in an equal number $k^{(2)}$ of summary and payoff events (i.e. a second $A(k^{(2)})$ event), such that $k^{(1)}$<K and $k^{(2)}$<K. According to single session analysis, events $A(k^{(1)})$ and $A(k^{(2)})$ considered separately may be determined as resulting from human interaction (i.e. human traffic H). Assuming that events $A(k^{(1)})$ and $A(k^{(2)})$ are independent, the joint probability can be defined, $Prob(A(k^{(1)}),A(k^{(2)}))=Prob(A(k^{(1)}))*Prob(A(k^{(2)}))$, where $Prob(A(k^{(1)}))$ and $Prob(A(k^{(2)}))$ are probabilities of events $A(k^{(1)})$ and $A(k^{(2)})$ resulting from queries $Q^{(1)}$ and $Q^{(2)}$ in sequential sessions. Using the cross session analysis (e.g. at step 1020), the robot detector may compare the joint probability $Prob(A(k^{(1)}),A(k^{(2)}))$ and the minimum acceptable probability p_h. If the joint probability $Prob(A(k^{(1)}) A(k^{(2)}))$ is less than the minimum acceptable probability p_h, the robot detector can decide that both events $A(k^{(1)}),A(k^{(2)})$ in two sequential sessions correspond to robotic traffic B. In this example, based on the determination that two events $A(k^{(1)}),A(k^{(2)})$ in sequential sessions correspond to robotic traffic, the robot detector can specify an acceptance threshold K'=2 as being less than to two (2) such that the larger the k in the A(k) event, the less likely the robot detector is to decide that traffic from the source identifier is human. Finally, the robot detector can set the threshold value K to be the average of acceptance thresholds (e.g., K', K", . . . ) over cases where the joint probability $Prob(A(k^{(i)}),A(k^{(i+i)}))$ is greater than the minimum acceptance probability p_h.

In exemplary embodiments, a finite state machine can be implemented. For example, the finite state machine can include three (3) states: H, B, and A(k), where a state transition matrix T includes a set of transition probabilities Pij from state i to state j. Based on the transition matrix T, conditional proximities P(Si|Sj) can be defined and used to adjust the threshold value K. Alternatively, or in addition, conditional probabilities can be used to make decisions regarding the A(k) events during cross session analysis (e.g., Bayesian inference).

As an example of advanced anti-bot analysis using query structure analysis (which may be used in conjunction with or instead of cross-session analysis to detect robotic traffic), a finite state machine can be implemented by the robot detector. The states of the finite state machine can include query keywords and/or parameters. As a non-limiting example, a first state can be a topic/category of the search, which can be denoted as TS, a second state can be a publication year to be searched, which can be denoted as PY, a third state can be an author name to be searched, which can be denoted as AU, and the like. A state transition matrix T can be built for each source identifier based on the sessions associated with each source identifier. The transition probabilities in the state transition matrix T form edges between the states to form a network of vertices (states) and edges (transition probabilities). A self-loop (diagonal elements of T) and loops (cliques) on the network can correspond to periodic patterns (periodic queries) generated by software robots. To perform the query structure analysis, the robot detector can use Bayesian interference, finite state machines (e.g., Hidden Markov Models), Symbolic Dynamics, embedding into multi-dimensional space followed by clustering (e.g., using kernel methods), and the like.

FIG. 11 is a flowchart of an exemplary time-invariant quantity-based robotic traffic detection process 1100 for detecting robotic traffic at the source-level based on events captured in usage logs associated with source identifiers (e.g., IP or MAC addresses). Exemplary embodiments of the process 1100 can be performed for each source identifier for each user identifier. As one example, the process 1100 can identify a user identifier having one or more source identifiers (e.g., IP or MAC addresses) associated with the user identifier, where each of the one or more source identifier can have one or more session identifiers associated therewith. The one or more session identifiers can correspond to usage logs and the traffic detector can process each source identifier associated with the user identifier to detect robotic traffic in each of the source identifiers. The process 1100 can be repeated for each user identifier, for example, until the source identifiers associated with each of the user identifiers have been processed for robotic traffic detection. In some embodiments, the process 1100 can be performed sequentially for each source identifier for each user identifier as described herein. In some embodiments, the process 1100 can be performed in parallel such that queries and/or usage logs for multiple source identifiers, for one or more user identifiers, can be processed substantially simultaneously as described herein.

With respect to the example process 1100 shown in FIG. 11, at step 1102, the robot detector retrieves usage logs (having session identifiers) associated with a source identifier (e.g., an IP or MAC address) of a user identifier. At step 1104, the robot detector identifies a quantity of sessions having usage logs with a single query (#SQ). At step 1106, the robot detector groups sessions into (A) multiple query sessions and (B) single query sessions. For the group of sessions having multiple queries (A), the process proceeds to step 1108, and for the group of sessions having a single query (B), the proceeds to step 1120.

At step 1108, for the group of multi-query sessions for the source identifier (A), the events in the usage logs are grouped for each query based on time. At step 1110, the robot detector performs the process 700 shown in FIG. 7. At step 1112, the robot detector determines whether there are more source identifiers associated with the user identifier. If there are more source identifiers associated with the user identifier, the process 1100 repeats from step 1102 for the next source identifier associated with the user identifier. If there are no more source identifiers associated with the user identifier, the process 1100 proceeds to step 1114 to determine whether there are more user identifiers to be processed. If there are more user identifiers to be processed, at step 1116, the robot detector identifies the next user identifier and the process 1100 repeats from step 1102 for a source identifier associated with the next user identifier. If there are no more user identifiers to be processed, at step 1118, the robot detector outputs source identifiers and/or their associated usage logs that have been identified as being related to intention user traffic to the metric generator for further processing.

At step 1120, for the group of single query sessions for the source identifier (B), the robot detector determines whether the quantity of usage logs having a single query for the source identifier exceeds a threshold value. The threshold value can be determined based on statistics analysis of a training data which can include usage logs for a given time period, e.g., a twenty-four hour time period. As one example, the threshold value can be an average or median of single-query sessions in the training data and/or a ratio between single sessions and multi-query sessions. The training data can be updated as new usage logs are generated and as such the threshold value may be generated dynamically as the training data changes. If the quantity of sessions having usage logs with a single query for the source identifier does not exceed the threshold value, the process 1100 proceeds to step 1110 at which the robot detector performs the process 700 shown in FIG. 7. If the quantity of sessions having usage logs with a single query for the source identifier does exceed the threshold value, the process 1100 proceeds to steps 1122 and 1124. At step 1122, the robot detector identifies a quantity of summary events (#SE_IP) for the source identifier, and at step 1124, the robot detector identifies a quantity of payoff events (#PE_IP) for the source identifier. At step 1126, the robot detector determines whether the quantity of payoff events (#PE_IP) for the source identifier exceeds the quantity of summary events (#SE_IP) for the source identifier. If not, the process 1100 proceeds to step 1110 at which the robot detector performs the process 700 shown in FIG. 7. If the quantity of payoff events (#PE_IP) for the source identifier does exceed the quantity of summary events (#SE_IP) for the source identifier, the process 1100 proceeds to step 1128 at which the robot detector determines with a source identifier weight does not exceed a threshold weight value. If so, at step 1130, the robot detector identifies the usage logs corresponding to the source identifier as including intentional human behavior and proceeds to step 1110 at which the robot detector performs the process 700 shown in FIG. 7. Otherwise, at step 1132, the robot detector identifies the usage logs corresponding to the source identifier as robotic traffic, and the process proceeds from step 1112, as described herein.

FIG. 12 is a flowchart of an exemplary time-invariant quantity-based robotic traffic detection process 1200 for detecting robotic traffic at the IP or MAC address-level (e.g., at the source identifier level) based on events captured in usage logs associated with source identifiers (e.g., IP or MAC addresses). Exemplary embodiments of the process 1200 can be performed for each source identifier for each user identifier. As one example, the process 1200 can identify a user identifier having one or more source identifiers associated with the user identifier, where each of the one or more source identifiers can have one or more session identifiers associated therewith. The one or more session identifiers can correspond to usage logs and the traffic detector can process each source identifier associated with the user identifier to detect robotic traffic associated with each of the source identifiers. The process 1200 can be repeated for each user identifier, for example, until the source identifiers associated with each of the user identifiers have been processed for robotic traffic detection. In some embodiments, the process 1200 can be performed sequentially for each source identifier for each user identifier as described herein. In some embodiments, the process 1200 can be performed in parallel such that queries and/or usage logs for multiple source identifiers, for one or more user identifiers, can be processed substantially simultaneously as described herein.

With respect to the example process 1200 shown in FIG. 12, at step 1202, the robot detector retrieves usage logs (having session identifiers) associated with a source identifier of a user identifier. At step 1204, the robot detector identifies a quantity of sessions having usage logs with a single query (#SQ) and identifies a quantity of sessions having usage logs with multiple queries (#MQ). At step 1206, the robot detector groups sessions into (X) multiple query sessions and (Y) single query sessions. For the group of sessions having multiple queries (X), the process proceeds to step 1208, and for the group of sessions having a single query (Y), the process 1200 proceeds to step 1228.

At step 1208, for the group of multi-query sessions for the source identifier, the events (e.g., summary and payoff events) in the usage logs are grouped per query based on time. For example, events in a query in a multiple query session associated with the source identifier first can be grouped based on the type of event (e.g., summary or payoff) and then by the time the event occurred. At step 1210, the robot detector identifies a quantity of summary events (#SE_q) that occurred for a query in a usage log, and at step 1212, the robot detector identifies a quantity of payoff events (#PE_q) that occurred for the query in the usage log. If the quantity of payoff events is less than the quantity of summary events, the query and associated events are attributed to intentional human behavior at step 1214 and proceed to step 1216. If the quantity of payoff events is equal to or greater than the quantity of summary events, the process 1200 proceeds to step 1218, at which the robot detect performs one of analyses. For example, at step 1218, the robot detector can determine whether the quantity of payoff events is equal to the quantity of summary events and are less than a threshold value K. If so, the process 1200 proceeds to step 1216. If not, at step 1220, the robot detector identifies the query and associated events as being associated with robotic traffic and removes, deletes, or purges the query and associated events from the usage log and/or removes the robotic traffic from further processing.

After either of steps 1216 or 1220, the process 1200 can proceed to step 1222 to determine whether there are any more queries in any more usage logs associated with the IP address. If not, the process 1200 proceeds to step 1224 at which the robot detector outputs the queries and associated events associated with intentional human behavior for further processing. If there are more queries, the process 1200 proceeds to step 1226 to identify the next query to process and repeats from step 1210.

At step 1228, for the group of single query sessions for the source identifier (Y), the robot detector identifies a quantity of summary events (#SE) that occurred for in single query usage log, and at step 1230, the robot detector identifies a quantity of payoff events (#PE) that occurred for the single query usage log. If the quantity of payoff events is greater than the quantity of summary events at step 1232, the robot detector identifies the single query usage log as being associated with robotic traffic and removes, deletes, or purges the single query usage log and/or removes the robotic traffic from further processing at step 1238. Otherwise, the process 1200 proceeds to step 1234, at which the robot detect performs one or analyses. For example, at step 1234, the robot detector can determine whether the quantity of payoff events is equal to the quantity of summary events and whether each are less than a threshold value K. If so, the process 1200 proceeds to step 1236, at which the robot detector attributes the single query usage log to intentional human behavior. If not, at step 1238, the robot detector identifies the single query usage log as being associated with robotic traffic and removes, deletes, or purges the query and associated events from the usage log and/or removes the robotic traffic from further processing.

After either of steps 1236 or 1238, the process proceeds to step 1240, at which the robot detector determines whether there are more usage logs to process for the source identifier. If so, the process 1200 proceeds to step 1242 to identify the next session identifier to processed and repeats from step 1228 for the next usage log associated with the next session identifier. If not, at step 1244, the robot detector determines whether there are other source identifiers associated with the user identifier having usage logs to be evaluated. If there are other source identifiers associated with the user identifier having usage logs to be evaluated, the robot detector identifies the next source identifier and session identifier for the next source identifier at step 1246 and repeats from step 1202 for the next usage log associated with the next source identifier and the next session identifier. If there are no more source identifiers associated with a user identifier, the process proceeds to step 1248, at which the robot detector determines whether there are more user identifiers having usage logs to be evaluated. If there are more user identifiers, the robot detector identifies the next user identifier and the next source identifier for the next user identifier at step 1250, and repeats from step 1202. If there are no more user identifiers to process 1200 proceeds to step 1224.

FIG. 13 is a flowchart illustrating an exemplary process 1300 that can be utilized be embodiments of the present disclosure for detecting robotic traffic. At step 1302, one or more queries and/or usage logs are received and events that occurred during one or more sessions associated with the one or more queries and/or usage logs as well as a time at which the events occurred is identified by the robot detector. At step 1304, the robot detector determines a level of intentionality associated with the events represented in the one or more queries and/or usage logs on a per query and/or per usage log basis. The level of intentionality refers to the degree to which the user (human or robot) is interacting with the information retrieval system with deliberation and purpose to identify and retrieve works. The greater the level of intentionality in a query and/or usage log, the more likely it is that the usage log is indicative of human behavior.

In exemplary embodiments, the robot detector can use time-based detection to determine a level of intentionality for a given query and/or usage log based on an investment-payoff model that quantifies investments and payoff events in the usage log with respect to time. For example, the ratio of investments to payoff events can measure the intentionality of the usage log. Generally, investment made by a user during a session is reflected in a usage log as the quantity of events and time that the user spends leading up to a payoff event.

In some embodiments, the robot detector 220 can determine a level of intentionality associated with a payoff event in a usage log based on a time at which payoff event occurred, a number of search requests submitted by a user which were not followed by a payoff event prior to a current result set (e.g., before another search request is submitted), and an arrival rate, i.e., the expected number of "events" or "arrivals" that occur per unit time fitted to window of time that elapses before the payoff event (e.g., using a Poisson arrival process given by $$Pr(|A| = n) = \frac{(\lambda \Delta)^n}{n!} \exp(-\lambda \Delta)).$$

The maximum likelihood estimate for the arrival rate $\lambda$ can be the average number of log entries for the session prior to the payoff event.

If the level of intentionality exceeds an intentionality threshold value (step 1306), the query and/or usage log is classified as being associated intentional human behavior at step 1308. Otherwise, the query and/or usage log is classified as being associated with an automated software robot traffic at step 1310 and the query and/or usage log is removed, deleted, or purged. The threshold value can be specified based on historic and/or training data, and the robot detector 220 can classify events and/or usage logs that exceed the threshold value as corresponding to human behavior. Regardless of whether the usage log is classified as being associated with a human or an automated software robot, the process 1300 continues at step 1312, to determine whether there are more queries and/or usage logs to evaluate. If so, the process repeats from step 1302. If not, at step 1314, the queries and/or usage logs are output to for further processing, e.g., by the metric generator as described herein.

Figure 14:
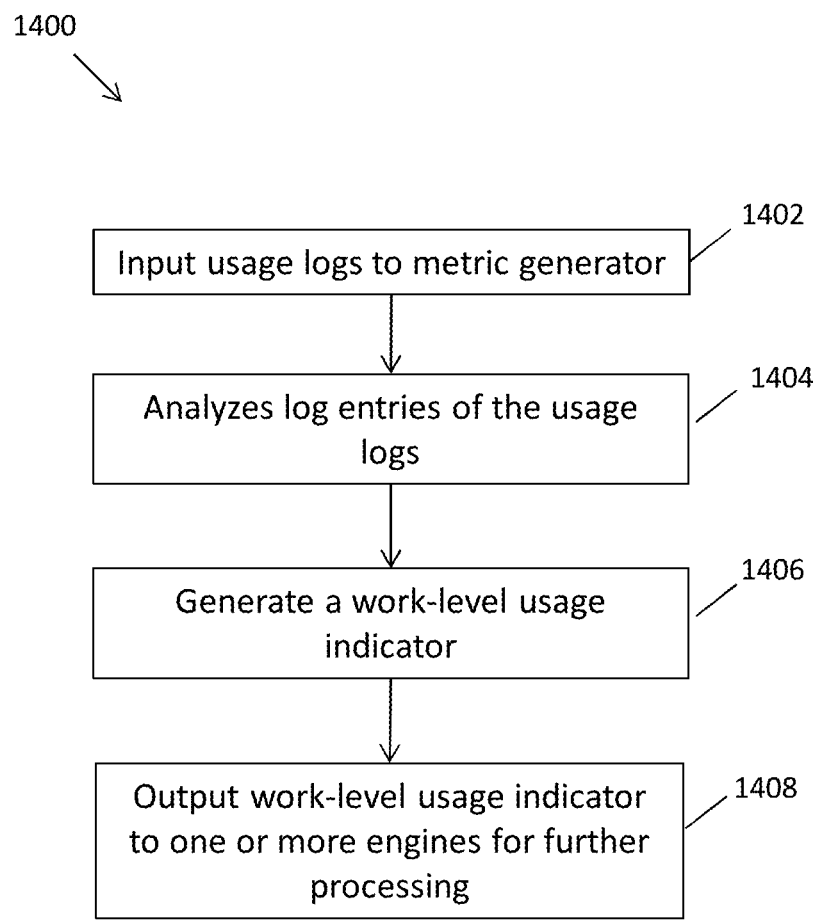
FIG. 14 is a flowchart illustrating process of generating one or more work-level (article-level) usage indicators.

FIG. 14 is a flowchart illustrating process 1400 of generating one or more work-level (e.g., article-level) usage indicators. At step 1402, usage logs that have been classified as being associated with human behavior are input to a metric generator. At step 1404, the metric generator analyzes the log entries of the usage log as described herein to identify works that were retrieved or otherwise accessed during the session represented by the log. At step 1406, the metric generator can generate a work-level usage indicator based at on a quantity of times a work was retrieved over a specified time period. At step 1408, the work-level usage indicator can be output to a forecast engine, a trending engine, a recommendation engine, and/or a ranking engine for further processing.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A method of cleansing data generated by one or more servers in response to database interactions resulting from an automated software robot interacting with the one or more servers via a communications network, the method comprising:
    retrieving session events that occurred during one or more sessions between one or more user devices and the one or more servers, the one or more sessions being associated with one or more source identifiers;
    analyzing the session events in response to execution of a traffic analyzer to determine a first quantity of the session events associated with a first type of event and a second quantity of the session events associated with a second type of event;
    executing the traffic analyzer to detect whether the session events resulted from robotic traffic in response to determining that the first quantity of the session events associated with the first type of event exceeds the second quantity of the session events associated with the second type of event, wherein the session events resulted from the robotic traffic are detected based on time-invariant quantity-based robotic detection, and wherein the time-invariant quantity-based robotic detection is independent of the time at which events occur;
    implementing a query structure analysis including a finite state machine to determine whether the session events resulted from robotic traffic in response to determining the first quantity of the session events associated with the first type of event being less than or equal to the second quantity of the session events associated with the second type of event, wherein states of the finite state machine include query keywords or parameters and a state transition matrix is built for the one or more source identifiers; and
    in response to detecting that the session events resulted from robotic traffic, eliminating the session events that resulted from robotic traffic.

2. The method of claim 1, wherein each of the session events are associated with one or more queries, and the method further comprises:
    determining the first quantity and the second quantity for each of the one or more queries;
    determining, for each of the one or more queries, whether the session events resulted from robotic traffic or human interaction;
    excluding the session events that resulted from robotic traffic from generation of the metric; and
    including the session events that resulted from human intervention in generation of the metric.

3. The method of claim 1, further comprising:
    determining the first quantity and the second quantity for the one or more source identifiers;
    determining, for the one or more source identifiers, whether the session events associated with the one or more session identifiers resulted from robotic traffic or human interaction;
    excluding the session events for at least one of the one or more source identifiers from generation of the metric in response to determining that the session events associated with the at least one included robotic traffic; and
    including the session events for at least one of the one or more source identifiers in generation of the metric in response to determining that the session events associated with the at least one of the one or more source identifiers included human interaction.

4. The method of claim 1, wherein each of the session events are associated with one or more source identifiers and the one or more source identifiers are associated with one or more user identifiers, and the method comprises:
    determining the first quantity and the second quantity for each of the user identifiers;
    determining, for each of the user identifiers, whether the session events associated with the user identifiers resulted from robotic traffic or human interaction;
    excluding the session events for at least one of the one or more user identifiers from generation of the metric in response to determining that the session events associated with the at least one of the one or more user identifiers included robotic traffic; and
    including the session events for at least one of the one or more user identifiers in generation of the metric in response to determining that the session events associated with the at least one of the one or more user identifiers included human interaction.

5. The method of claim 1, wherein the first type of event corresponds to presentation of search results in one or more graphical user interfaces and the second type of event corresponds to receiving a selection of one or more actions associated with the results.

6. The method of claim 1, further comprising:
    determining whether a source from which search requests are received implements a software robot that generates the robot traffic.

7. The method of claim 1, wherein each of the usage logs are associated with a user identifier, and method further comprises:
    determining whether an account associated with the user identifier implements a software robot that generates the robot traffic.

8. The method of claim 1, further comprising:
    identifying the log entries as robotic traffic in response to determining that the first quantity exceeds the second quantity.

9. The method of claim 1, further comprising:
    identifying the session events as traffic corresponding to human interaction in response to determining that the first quantity is less than the second quantity.

10. The method of claim 1, further comprising:
    performing exception handling to determine whether the session event correspond to robotic traffic in response to determining that the first quantity is equal to the second quantity.

11. The method of claim 10, wherein performing exception handling comprises:
    determining whether the first quantity and the second quantity are each less than a threshold value.

12. The method of claim 11, wherein, in response to determining that the first and second quantities are each less than the threshold value, identifying the session events as traffic corresponding to human interaction.

13. The method of claim 11, wherein, in response to determining that the first and second quantities are each greater than the threshold value, identifying the session events as robotic traffic.

14. The method of claim 11, wherein the threshold is generated based on training data including a training set of usage logs.

15. The method of claim 1, further comprising:
    identifying single query sessions and multi-query sessions associated with the one or more source identifier;
    grouping the single query sessions into a first group;

grouping the multi-query sessions into a second group; and independently evaluating the first and second groups in parallel to determine whether the one or more source identifiers is associated with robotic traffic.

16. The method of claim 15, wherein the first group and the second group are evaluated with different robotic traffic algorithms.

17. A system for cleansing data generated by one or more servers in response to database interactions resulting from an automated software robot interacting with the one or more servers via a telecommunications network, the system comprising:

one or more servers; and one or more databases including queries and session events associated with one or more sessions between user devices and the one or more servers, the one or more sessions being associated with one or more source identifiers, wherein the one or more servers are programmed to:

retrieve the session events from the one or more databases;

analyze the session events in response to execution of a traffic analyzer to determine a first quantity of the session events associated with a first type of event and a second quantity of the session events associated with a second type of event;

execute the traffic analyzer to detect whether the session events resulted from robotic traffic in response to determining that the first quantity of the session events associated with the first type of event exceeds the second quantity of the session events associated with the second type of event, wherein the session events resulted from the robotic traffic are detected based on time-invariant quantity-based robotic detection, and wherein the time-invariant quantity-based robotic detection is independent of the time at which events occur;

implementing a query structure analysis including a finite state machine to determine whether the session events resulted from robotic traffic in response to determining the first quantity of the session events associated with the first type of event being less than or equal to the second quantity of the session events associated with the second type of event, wherein states of the finite state machine include query keywords or parameters and a state transition matrix is built for the one or more source identifiers; and eliminate the session events that resulted from robotic traffic.

18. The system of claim 17, wherein the one or more servers is configured to:

identify the session events as the traffic corresponding to human interaction in response to determining that the first quantity is less than the second quantity; and perform exception handling to determine whether the session events correspond to robotic traffic in response to determining that the first quantity is equal to the second quantity.

19. The system of claim 18, wherein the one or more servers perform exception handling by determining whether the first quantity and the second quantity are each less than a threshold value, wherein, in response to determining that the first and second quantities are each less than the threshold value, the one or more servers identify the log entries as traffic corresponding to human interaction, and wherein, in response to determining that the first and second quantities are each greater than the threshold value, the one or more servers identify the log entries as robotic traffic.

20. A non-transitory computer-readable medium storing instructions, wherein execution of the instructions by a processing device causes the processing device to:

retrieve session events from one or more databases, the session events being associated with one or more sessions between one or more user devices and the one or more servers, the one or more sessions being associated with a source identifier;

analyze the session events in response to execution of a traffic analyzer to determine a first quantity of the session events associated with a first type of event and a second quantity of the session events associated with a second type of event;

execute the traffic analyzer to detect whether the session events resulted from robotic traffic in response to determining that the first quantity of the session events associated with the first type of event exceeds the second quantity of the session events associated with the second type of event, wherein the session events resulted from the robotic traffic are detected based on time-invariant quantity-based robotic detection, and wherein the time-invariant quantity-based robotic detection is independent of the time at which events occur;

implementing a query structure analysis including a finite state machine to determine whether the session events resulted from robotic traffic in response to determining the first quantity of the session events associated with the first type of event being less than or equal to the second quantity of the session events associated with the second type of event, wherein states of the finite state machine include query keywords or parameters and a state transition matrix is built for the one or more source identifiers; and eliminate the session events that resulted from robotic traffic.

* * * * *